(12) United States Patent
Brooks Powell et al.

(10) Patent No.: US 12,130,604 B2
(45) Date of Patent: Oct. 29, 2024

(54) COGNITIVE RETROFIT FOR LEGACY CONTROL DEVICES

(71) Applicant: International Business Machines Corporation, Armonk, NY (US)

(72) Inventors: Natalie Brooks Powell, Bolingbrook, IL (US); Shikhar Kwatra, San Jose, CA (US); Vijay Ekambaram, Chennai (IN); Nisarg Negi, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 17/678,442

(22) Filed: Feb. 23, 2022

(65) Prior Publication Data

US 2023/0266729 A1    Aug. 24, 2023

(51) Int. Cl.
*G05B 19/042*    (2006.01)
*G06N 20/00*    (2019.01)

(52) U.S. Cl.
CPC .......... *G05B 19/042* (2013.01); *G06N 20/00* (2019.01); *G05B 2219/2614* (2013.01)

(58) Field of Classification Search
CPC .............................. G05B 19/042; G06N 20/00
See application file for complete search history.

(56) References Cited

U.S. PATENT DOCUMENTS 9,418,802 B2 * 8/2016 Romano ................. H01H 3/22
10,627,128 B1 * 4/2020 Zhang ..................... F24F 11/77
(Continued)

FOREIGN PATENT DOCUMENTS

CN    204287860 U    4/2015
IN    201621025276 A    1/2018
(Continued)

OTHER PUBLICATIONS

Mead, Lutron's New Smart Dimmer Fits Over Existing Light Switches, May 22, 2019, https://linkdhome.com/articles/2019/5/22/lutrons-new-smart-dimmer-fits-over-existing-light-switches.
(Continued)

*Primary Examiner* — Mark A Connolly
(74) *Attorney, Agent, or Firm* — Garg Law Firm, PLLC; Rakesh Garg; Jared Chaney

(57) ABSTRACT

An embodiment includes retrofitting an existing control device with an automation panel that senses manual actuation of a control element of the control device, and automatically actuates the control element in response to a specified control signal. The embodiment collects state data indicative of an actuation state of the control element and context data of conditions at a time that the state data is collected, and generates a training dataset comprising collected state data and sensor data. It then uses this data to train a classification model to predict a control element actuation state based on sensor data. The embodiment deploys the trained classification model to process sensor data and upon detecting a mismatch between a predicted actuation state output from the trained classification model and an actual actuation state of the control element, the embodiment transmits the specified control signal to the automation panel to actuate the control element.

20 Claims, 16 Drawing Sheets

(56) References Cited

U.S. PATENT DOCUMENTS

2011/0312382 A1* 12/2011 Itay .................... H01Q 1/2275
                                                                455/558
2017/0150576 A1* 5/2017 Thijssen ............. H05B 47/175
2019/0394863 A1 12/2019 Elliot et al.

FOREIGN PATENT DOCUMENTS

WO      2019059514 A1    3/2019
WO      2021056100 A1    4/2021

OTHER PUBLICATIONS

Amazon.com, Switchmate Snap-On Instant Smart Light Switch That Listens—Switchmate Toggle, 2022, https://www.amazon.com/Switchmate-Snap-Instant-Switch-Listens/dp/B01EV7FXOA#:~:text=Switchmate%20instantly%20attaches%20magnetically%20to,re%20away%20from%20your%20home.

* cited by examiner

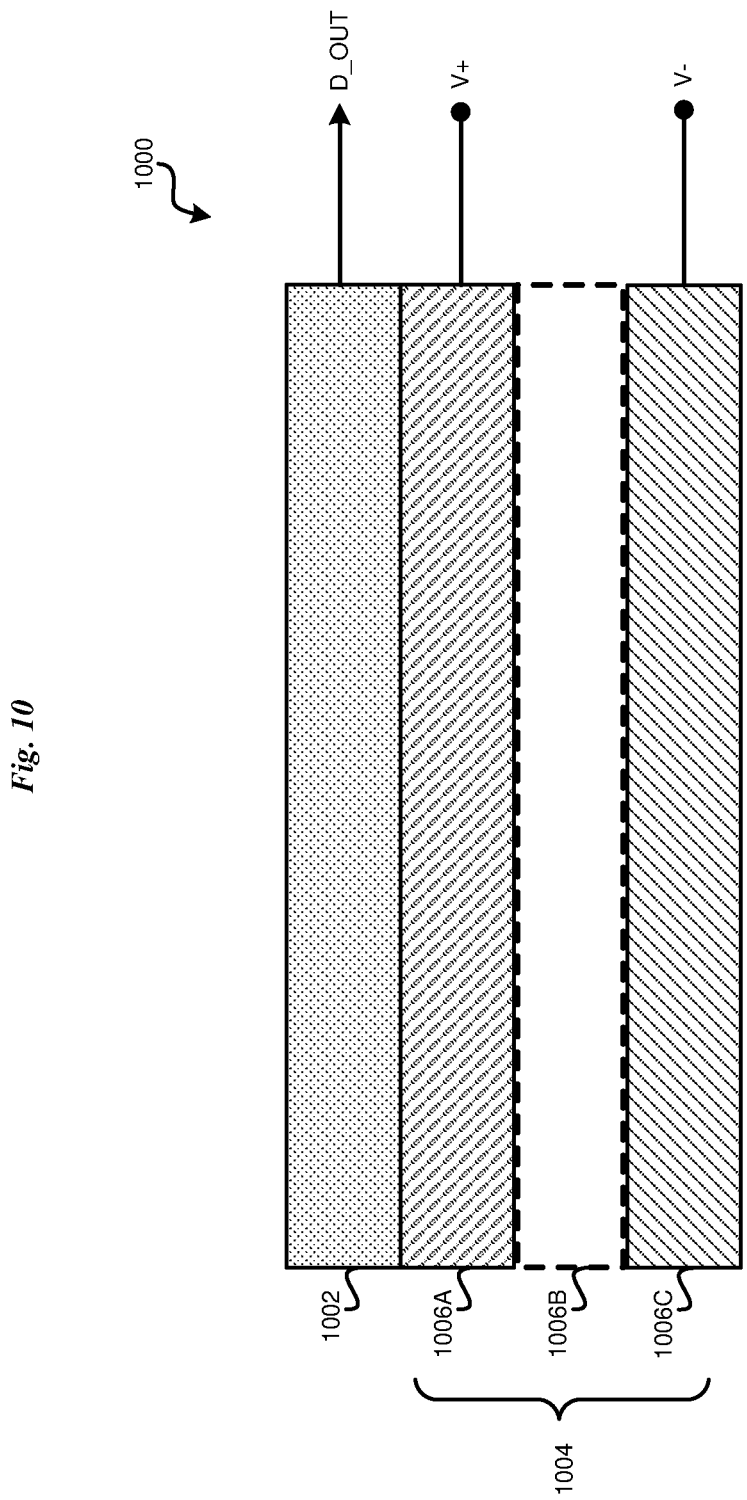

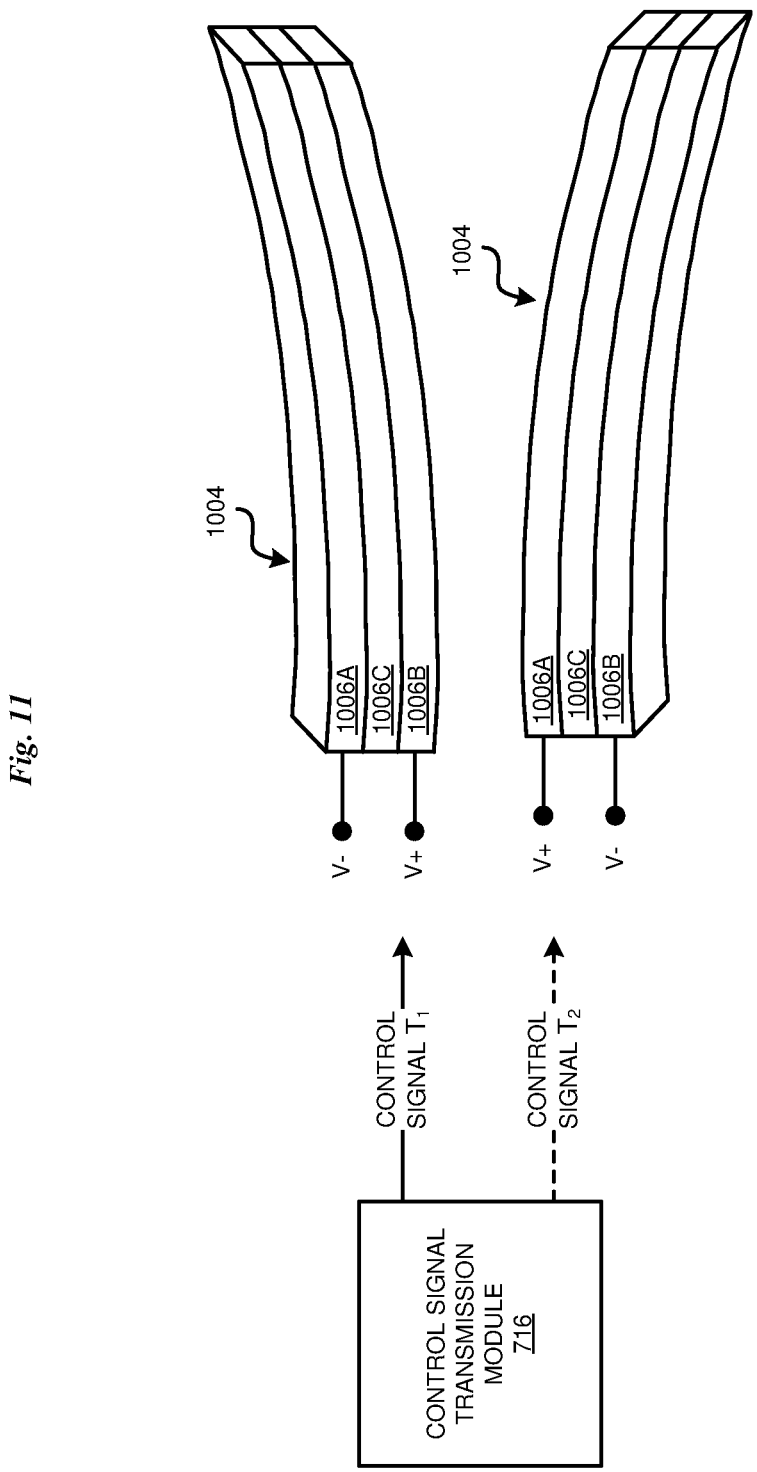

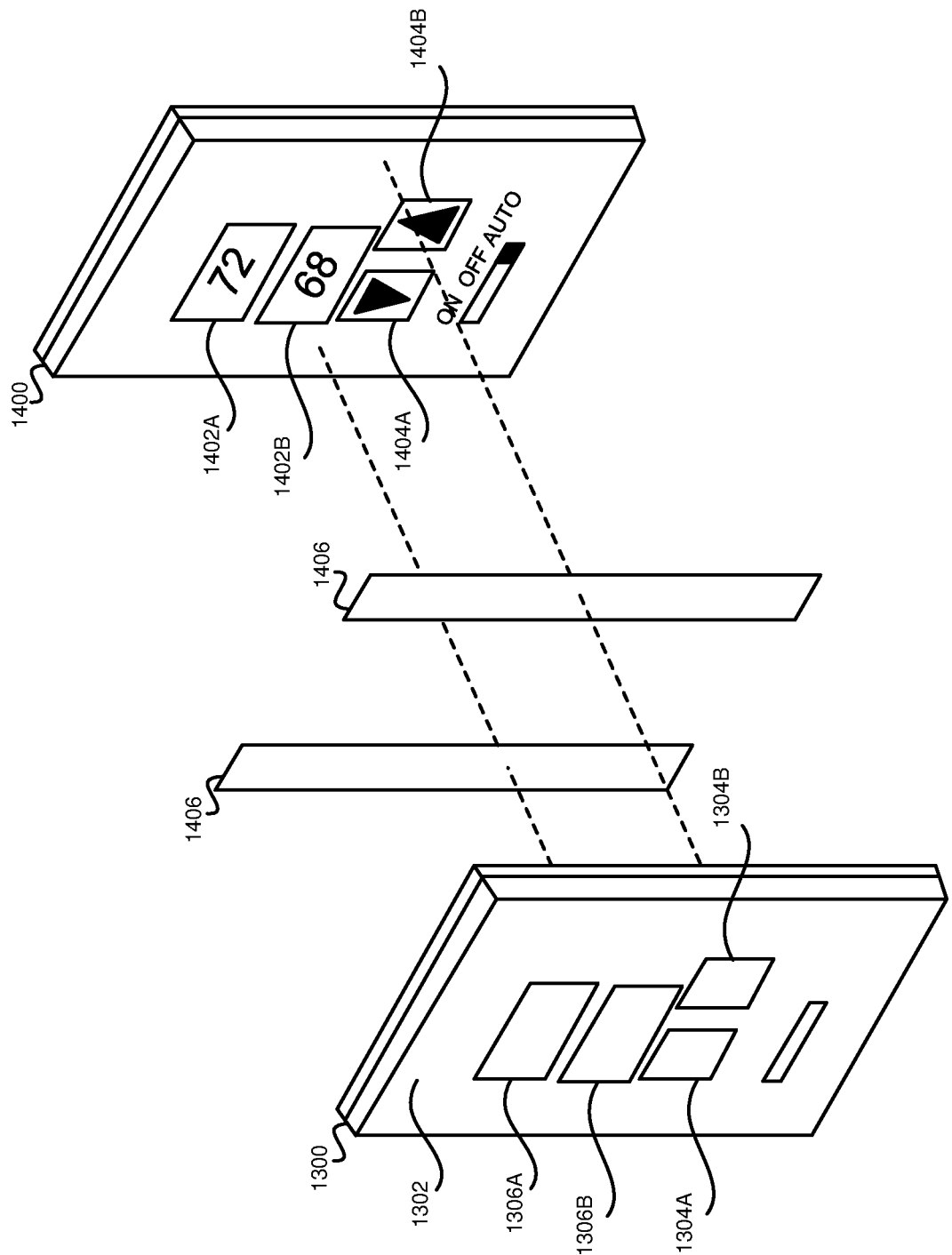

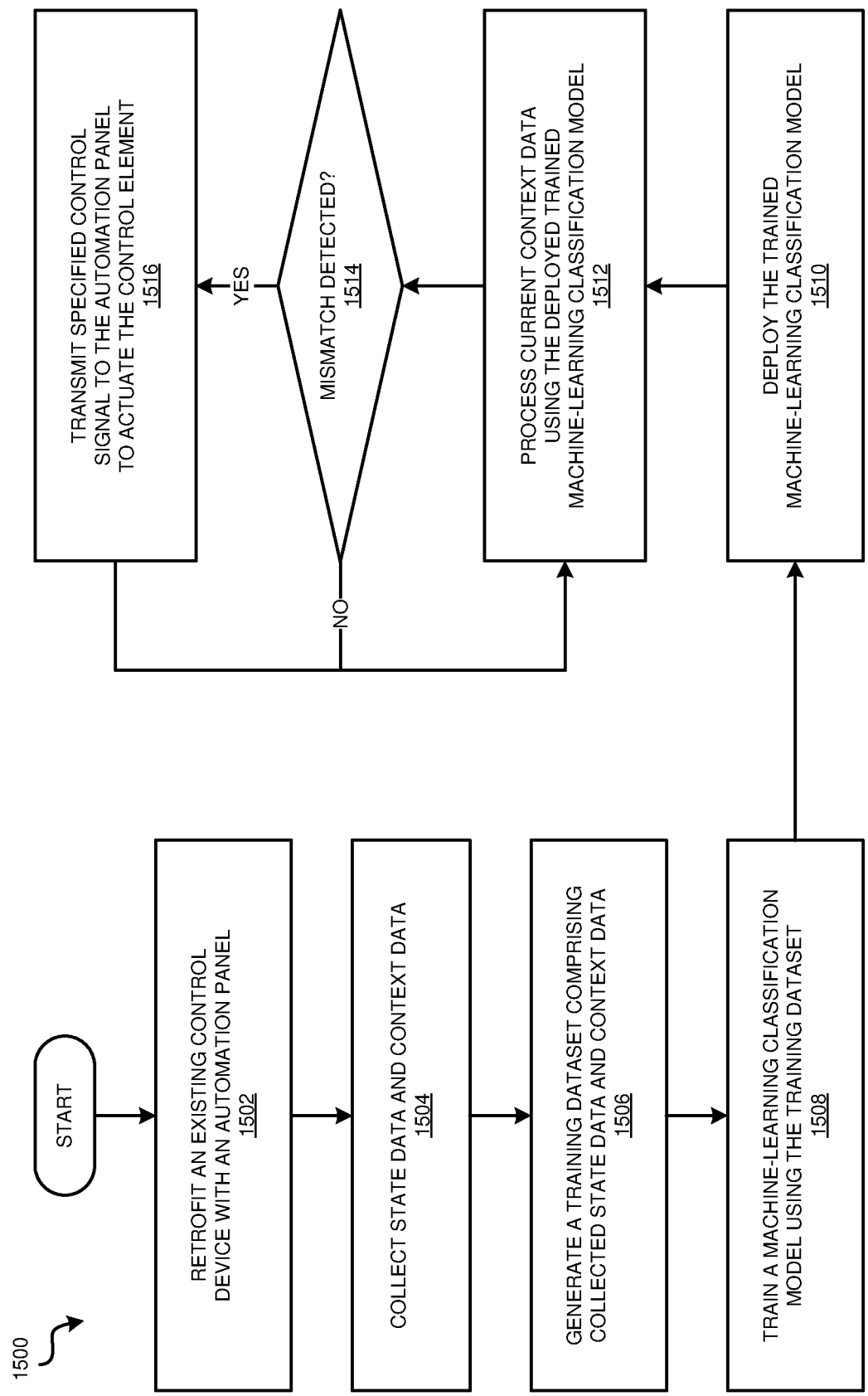

COGNITIVE RETROFIT FOR LEGACY CONTROL DEVICES

BACKGROUND

The present invention relates generally to a system and method for chemical and biochemical samples. More particularly, the present invention relates to a system and method for a cognitive retrofit for legacy control devices.

Over the past several years, the electronics industry has seen the introduction of a wide variety of different types of "smart devices." A smart device is generally considered to be a device that is capable of collecting sensor data indicative of the device's state and/or environment, communicating with other devices across a computer network, and operating autonomously or remotely by other devices. Examples of smart devices include a such things as smart phones, smart televisions, smart thermostats, smart door locks, and smart lighting systems.

Many smart devices are designed to replace legacy counterparts that require manual operation and lack network connectivity. For example, a smart light switch is designed to replace a legacy standard light switch. The term "legacy" is used herein to refer to apparatus that lack features commonly associated with Internet of Things (IoT) or smart devices, such as sensors, software, and other technologies that enable connecting and exchanging data with other devices and systems over a network. Legacy devices include, for example, simple light switches that are used in a variety of residential and commercial settings and are generally installed in electrical boxes in a wall with a wall plate installed as a cover for the electrical box. Legacy wall switches are usually installed by a contractor within a building during construction. In some cases, a light switch might be installed in a box with one or more other components, such as other light switches, power receptacles, wires, and/or cables. The contractor covers the light switch and the electrical box with a wall plate, which is generally thought of as an aesthetic element, but it also serves protects people from high voltages and currents that may be running through exposed wires and switch hardware.

Smart devices may be smart variations of a variety of other legacy physical devices or products, such as industrial equipment, farm machinery, home appliances, manufacturing devices, industrial printers, automobiles, thermostats, traffic lights, vehicles, buildings, etc. These smart devices may have embedded electronics, software, sensors, and network connectivity that enables these physical devices to collect and exchange data. Smart devices may be useful for a number of applications, such as environmental monitoring, farming, infrastructure management, industrial applications, building and home automation, energy management, medical and healthcare systems, transport systems, etc.

For example, a "smart home" is a residence that includes a computer-based system that automates various tasks subject to user preferences or past behaviors. For example, smart home systems may control thermostat settings, security systems, door locks, and lighting systems. A smart home system may include a collection of compatible smart devices communicate with a smart home control system that monitors and controls the smart devices and allows users to remotely monitor and control the devices.

SUMMARY

The illustrative embodiments provide for a cognitive retrofit for legacy control devices. An embodiment includes retrofitting an existing control device with a multi-layered automation panel, where the automation panel comprises a first layer that senses manual actuation of a control element of the control device, and a second layer that automatically actuates the control element in response to a specified control signal. The embodiment also includes collecting, by a processor, periodically for a predetermined period of time, state data indicative of an actuation state of the control element, and context data of conditions at a time that the state data is collected, the context data comprising sensor data indicative of an environmental property affected by a state of a system that is altered by actuation of the control element. The embodiment also includes generating, by the processor, a training dataset comprising state data and context data collected during the predetermined period of time. The embodiment also includes training, by the processor, a machine-learning classification model using the training dataset to output a predicted actuation state of the control element based on inputted context data. The embodiment also includes deploying, by the processor, the thus trained machine-learning classification model to process current context data. The embodiment also includes detecting, by the processor, a mismatch between the predicted actuation state output from the trained machine-learning classification model and an actual actuation state of the control element. The embodiment also includes transmitting, by the processor, automatically responsive to the mismatch, the specified control signal to the automation panel thereby causing the automation panel to actuate the control element. Other embodiments of this aspect include corresponding computer systems, apparatus, and computer programs recorded on one or more computer storage devices, each configured to perform the actions of the embodiment.

Other embodiments of this aspect include corresponding computer systems, apparatus, and computer programs recorded on one or more computer storage devices, each configured to perform the actions of the embodiment.

An embodiment includes an automation system comprising a multi-layered automation panel configured to be retrofitted onto an existing control device, where the control device comprises a control element that remains manually actuatable by a user after the retrofitting, and where the automation panel comprises a first layer that senses manual actuation of the control element and a second layer that automatically actuates the control element in response to a specified control signal. The automation system also comprises a controller comprising one or more computer readable storage media, and program instructions collectively stored on the one or more computer readable storage media.

An embodiment includes a computer usable program product. The computer usable program product comprises one or more computer readable storage media, and program instructions collectively stored on the one or more computer readable storage media. In some embodiments, the program instructions are executable by one or more processors to cause the one or more processors to perform operations comprising detecting registration of a multi-layered automation panel on a network, the multi-layered automation panel being retrofitted to an existing control device, where the control device comprises a control element that remains manually actuatable by a user after the retrofitting, and where the automation panel comprises a first layer that senses manual actuation of the control element and a second layer that automatically actuates the control element in response to a specified control signal.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 10 depicts a cross-sectional view taken across section line X-X of the automation panel of Fig;

FIG. 11 depicts a schematic block diagram of an example of actuator deflection in accordance with an illustrative embodiment;

FIG. 14 depicts an exploded view of the automation panel retrofitted to a legacy control device in accordance with an illustrative embodiment; and FIG. 15 depicts a flowchart of an example process for a retrofitting an automation panel onto a legacy control device in accordance with an illustrative embodiment.

DETAILED DESCRIPTION

Figure 1:
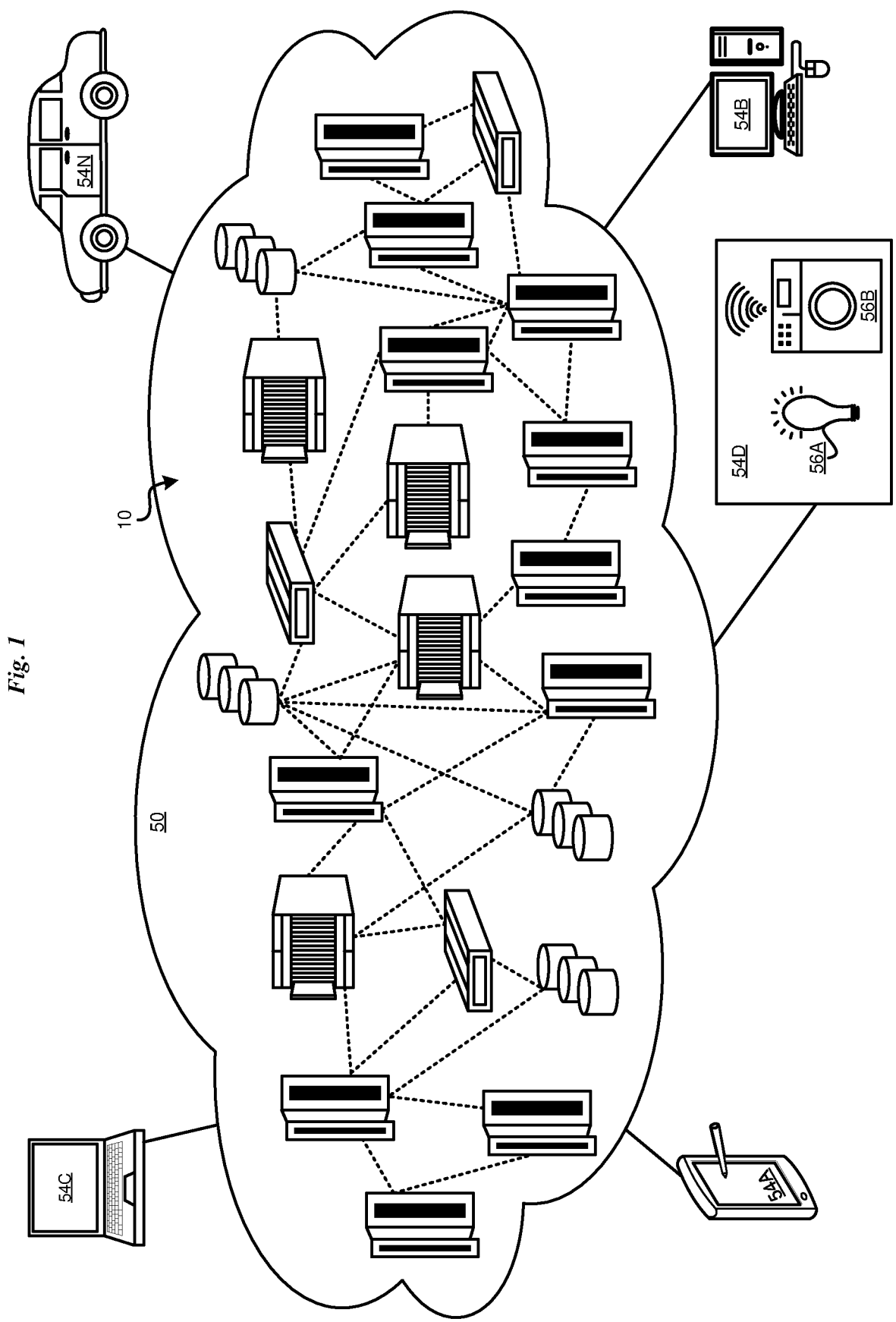
FIG. 1 depicts a cloud computing environment according to an embodiment of the present invention.

Smart home systems provide many conveniences for homeowners, such as automatic control of security systems, sprinkler systems, and Heating, Ventilation, and Air Conditioning (HVAC) systems. Smart home systems also offer other benefits, such as increased security offered by smart securing systems, and improved energy efficiency and reduced energy costs through more optimal operation of lighting and HVAC systems and smart appliances, such as smart refrigerators that operate more efficiently than their legacy counterparts. These are among the many reasons for an increasing interest in smart home technologies among consumers.

However, despite these many positives, mass adoption of smart home technologies has been tempered in part due to consumer price sensitivity and perceptions of installation complexity and expense. For example, many consumers prefer to opt for professional installation of hardwired components. For example, installation of a smart light switch requires knowledge of residential wiring to replace a legacy manual light switch with a smart light switch correctly and safely. Also, the installation, replacement, and removal of legacy light switch may be inefficient and time consuming due to the manual labor required and the need to proceed carefully due to the potential for exposure to high voltage and current levels. This time consumption and inefficiency as well as cost is multiplied by the fact that a single home or other building can include dozens of legacy light switches, each requiring individual removal and replacement.

The smart-home environment can further include a variety of partially communicating legacy appliances. For example, the smart-home environment may include infrared (IR) controlled wall air conditioners or other IR-controlled devices, which can be controlled by IR signals from handheld remote-control devices or an automation panel that includes an IR LED for emitting remote control signals for controlling such legacy appliances.

In some embodiments, a smart retrofit device is fitted to a legacy device. In some embodiments, the retrofit device is then connected to allow for communication with a smart home controller, for example via a wired or wireless connection. In some embodiments, the retrofit device communicates with a smart home controller via a network connection in which the retrofit device is registered onto the network and assigned a unique identifier, such as an Internet Protocol version 6 (IPv6) address, an IPv4 address, a uniform resource identifier (URI), or a global unique identifier. In some embodiments, the smart retrofit device may be able to communicate data over a network to a centralized smart home controller in a smart home environment. The smart device may register with the network or with the smart home controller prior to communicating data to the smart home controller.

In illustrative embodiments, the retrofit device communicates with a smart home controller that is a controller of one or more smart home devices (or Internet of Things (IoT) devices) in a particular location, such as a home or office. In some embodiments, the smart home controller acts as a management "hub" of information for smart home devices. The smart home devices include various IoT types of devices that can be connected to the Internet or a device controller and enable functions and/or services for a user. Examples include, but are not limited to, fireplaces, external faucets, and/or other devices such as large appliances (e.g., a refrigerator, a dishwasher, a washing machine, a dryer, and/or the like); small appliances (e.g., a toaster, a toaster oven, a microwave, a mixer, a blender, and/or the like); entertainment devices (e.g., a television, a radio, a media player, a gaming system, and/or the like); cleaning devices (e.g., a vacuum cleaner, an air purifier, and/or the like); climate control systems (e.g., a thermostat, a heater, a fan, an air conditioner, and/or the like); lighting systems (e.g., a lamp, a light fixture, a light switch, and/or the like); measuring devices (e.g., a clock, a scale, a thermometer, and/or the like); and/or any member of the internet of things that is now known or later developed.

In illustrative embodiments, the smart home controller includes a classifier module that constantly evaluates information (e.g., in real time or near-real time) provided from smart home devices and other data feed sources (e.g., weather data, traffic data, sunrise/sunset data, time of day data, etc.) in order to detect device patterns among the smart home devices and/or changes which might indicate an event (e.g., a change in a location of a user, a change in weather, a change in network traffic, etc.) that can trigger a response including modifying a function of one or more smart home devices, modifying a function of a smart home controller, transmitting alert message to a user, etc. For example, in some embodiments, the control signal transmission module is triggered depending on the output of the comparison module, which compares an actual state to a predicted state of one or more of the smart home devices, where the predicted state is predicted by the classifier module. An example smart home controller a home automation application used to control smart home devices in the home for lighting control, HVAC (heating, ventilation, and air conditioning), outdoor lawn irrigation, appliances, security systems, and/or the like. For example, all accounts from a smart television may be logged off when it is determined by one or more smart home devices that all users have left the house.

In illustrative embodiments, the smart home devices include an automation panel, which serves as an example of a retrofit device in accordance with an illustrative embodiment that has been fitted to a legacy device. In some embodiments, the automation panel includes an actuator, a touch sensor, a network interface, a temperature sensor, an IR controller, an IR emitter, and a power supply. In alternative embodiments, the automation panel can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In illustrative embodiments, the automation panel is an automation panel that has been retrofitted to an existing legacy control device, such as a legacy light switch that has a manual toggle or rocker switch as a control element. In illustrative embodiments, the automation panel comprises a touch sensor that senses manual actuation of the control element, and an actuator that automatically actuates the control element in response to a specified control signal from the control signal transmission module. In some embodiments, the automation panel includes a network interface that provides for communication with the smart home controller. It will be appreciated that there are many possible networking protocols and techniques that may be implemented, for example using wired or wireless communications, including Wi-Fi or Bluetooth communications (BLUETOOTH® is a registered trademark of Bluetooth SIG, Inc., Kirkland, Wash., U.S.A.).

In illustrative embodiments, the data collection module collects state data indicative of an actuation state of the control element of the control device that has been retrofitted with the automation panel. For example, In some embodiments, the automation panel infers the actuation state of the control element based on detected touch inputs via the touch sensor that senses touches by users when the users manually operate the control element.

In illustrative embodiments, the data collection module also collects context data indicative of environment and other conditions at the time the state data is collected. In some embodiments, the context data represents context information collected from one or more sensors and reference data from other sources of information. For example, in a typical usage scenario, the context data includes sensor data from one or more sensors, which may include any combination of sensors included with the automation panel and/or other separate sensors. In illustrative embodiments, the automation panel includes a temperature sensor that may provide data indicative of an ambient air temperature to the data collection module as part of the context data.

In alternative embodiments, the automation panel may also, or alternatively, include other sensors such as a motion sensor, light sensor, vibration sensor, and/or microphone. In some embodiments, sensors such as a motion sensor, microphone, and/or vibration sensor may provide context data indicative of whether a person is present. A light sensor data may provide context data indicative of an ambient light level. In embodiments in which the automation panel does not include one or more of these sensors, these sensors may be present elsewhere in the smart home environment and may provide such sensor data as context data to the data collection module. In addition to sensor data, the data collection module may also receive reference data, for example time and/or date data indicative of a time and/or date when the sensor data is collected, weather data indicative of weather conditions, or any other data that may contribute factors that a machine learning classifier should consider when determining whether to turn a light on or off, adjust a thermostat setting, or perform some other action associated with another type of control element. In some embodiments, the context data includes sensor data that is collected from a combination of sensors that include one or more sensors that are included in an automation panel and one or more sensors that separate from the automation panel.

As an example, in some embodiments, the context data includes sensor data indicative of an environmental property affected by a state of a system that is altered by actuation of the control element of a control device, and stores the collected data as collected data in the database. For example, in some embodiments, the control device is a light switch, the control element is the switching portion of a light switch, the environmental property is an ambient light level, actuation of the control element alters a state of a system (i.e., a lighting system is turned on or off), and the state of the system affects an environmental property (i.e., the ambient light level is higher when the lighting system is on and is lower when the lighting system is off). As another example, in some embodiments, the control device is a remote control for an HVAC system, the control element is a button on the HVAC remote control, the environmental property is an ambient air temperature, actuation of the control element alters a state of a system (i.e., an HVAC temperature setting is changed), and the state of the system affects an environmental property (i.e., the ambient temperature changes due to the change to the HVAC temperature setting).

In illustrative embodiments, the training dataset generation module fetches the collected data from the database. The training dataset generation module then processes the collected data into a format that can be used to train a machine learning classifier. For example, In some embodiments, the training dataset generation module utilizes the collected data to generate data sets for a feature set by applying confidence level and bias on feature sets. In an embodiment, training dataset generation module creates a data set for a plurality of variances of a feature set. In an embodiment, the training dataset generation module incorporates one or more context data variations as features that are correlated with state data values, with context data variations being provided on either side of an ON/OFF state boundary. In some embodiments, the distance from this boundary is used to establish a confidence value or confidence percentage. In some embodiments, the training dataset generation module utilizes linear regression analysis for every input variation to calculate which variations are within a confidence threshold (e.g., % confidence) of the boundary. Context data sets that exceed a confidence threshold (e.g., %) are marked as being indicative of the state for that side of the boundary. While the use of linear regression is suitable for binary classifier training data, various embodiments may use any classification modelling technique, such as a deep learning model, decision tree or other tree-based model, or other machine learning technique. For example, some embodiments involving more than two classes of distinction use logistic regression, particularly for generating classification data. Thus, the training dataset generation module generates a series of labeled datasets that correlate sensor data to state data. The training dataset generation module then stores the training data as training data in the database.

In illustrative embodiments, the ML training module trains a machine-learning classification model using the training dataset. In illustrative embodiments, the ML training module trains the ML classification model to output a predicted actuation state of the control element based on inputted context data. The ML training module then stores the trained ML classification model in the database.

In illustrative embodiments, the smart home controller deploys the thus trained machine-learning classification model to process current context data (i.e., context data in real time or near real time). Once deployed, the ML classification model outputs a predicted actuation state of the control element based on inputted context data. The ML classification model outputs the prediction to the comparison module. The comparison module compares the predicted actuation state from the ML classification model to an actual actuation state. If the actual actuation state does not match the predicted actuation state, the comparison module interprets this difference as a mismatch between the predicted actuation state and the actual actuation state. In some embodiments, the comparison module waits for a predetermined number of consecutive differences between the actual actuation state and the predicted actuation state, or waits for differences to exist for a predetermined amount of time, before considering a mismatch. By waiting for different results to be present for several cycles or for a length of time, the comparison module prevents transient conditions from triggering undesired actuations of the control element, for example which could result in undesirably frequent cycling of the actuation state of the control element. In some embodiments, when the comparison module determines that a mismatch condition is present, it issues a mismatch notification to the control signal transmission module.

In illustrative embodiments, when the control signal transmission module receives a mismatch notification from the comparison module, the control signal transmission module generates a control signal appropriate for triggering actuation of the control element. For example, in some embodiments, the control signal transmission module may be a module of a smart home controller for a plurality of different smart home devices, which may include one or more automation panels that are retrofitted to respective control devices each having a control element that responds to respective different control signals. In some such embodiments, the control signal transmission module determines the correct control signal for actuating the control element that is in a mismatch condition, for example by fetching control signal data from a lookup table. The control signal transmission module then transmits the specified control signal to the control element that has the detected mismatch condition, and thereby causes the actuation of that control element.

In illustrative embodiments, the database is stored on a computer readable storage medium and is used to store persistent data for the smart home controller. For example, the database includes training data, a machine learning model, and data collected by the data collection module as collected data.

In some embodiments, the automation panel includes an IR controller and an IR emitter that transmit remote-control signals to an HVAC system. In some such embodiments, the ML classification model is also trained to predict HVAC settings. Once in runtime, if the comparison module detects a mismatch between a current temperature setting and a temperature setting predicted by the classifier module, it issues a mismatch notification to the control signal transmission module. In some embodiments, when the control signal transmission module receives a mismatch notification from the comparison module, the control signal transmission module generates a control signal appropriate for triggering the IR controller to control the IR emitter to issue a signal to the HVAC system to adjust the temperature setting to the predicted value. In some such embodiments, the control signal transmission module determines the correct control signal for activating the IR controller, for example by fetching control signal data from a lookup table. The control signal transmission module then transmits the specified control signal to the control element that has the detected mismatch condition, and thereby causes the adjustment of the temperature settings.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
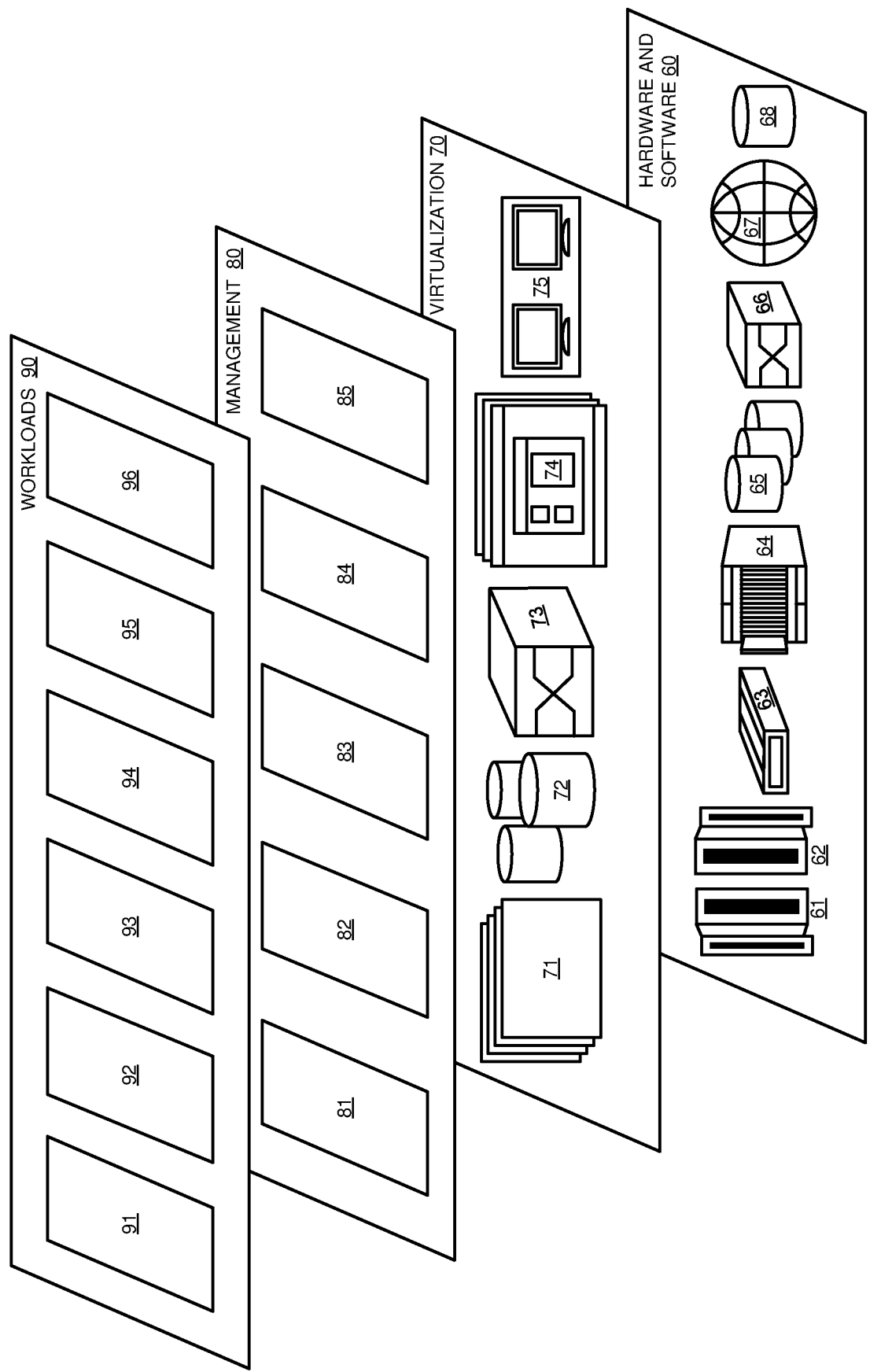
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for attribute-based positioning of bookmarks in a 3D virtual space. In addition, workloads and functions 96 for smart home processing, which may include such operations as generating training data, training a machine-learning classifier using the training data, and using the trained machine-learning classifier to classify sensor data to a predicted class associated with one of a plurality of actuation states of a control element of a retrofitted control device. In some embodiments, the workloads and functions 96 also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
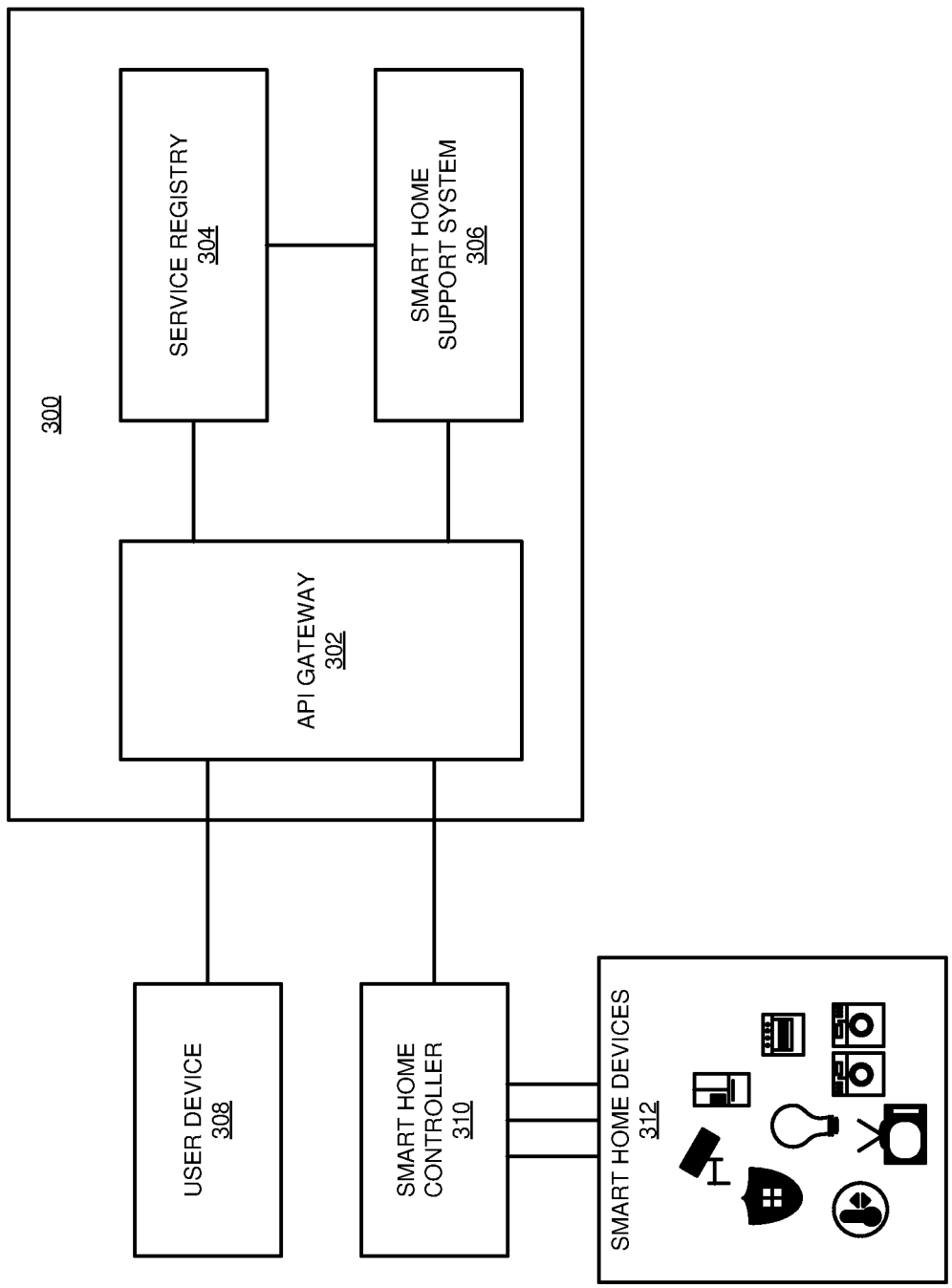
FIG. 3 depicts a block diagram of an example service infrastructure that includes a smart home support system in accordance with an illustrative embodiment.

With reference to FIG. 3, this figure depicts a block diagram of an example service infrastructure 300 that includes a smart home support system 306 in accordance with an illustrative embodiment. In some embodiments, the smart home support system 306 is deployed in workloads layer 90 of FIG. 2. By way of example, in some embodiments, smart home support system 306 is implemented as a cloud-based system for smart home processing that may be shared by multiple users.

In the illustrated embodiment, the service infrastructure 300 provides services and service instances to a user device 308 and to a smart home controller 310 associated with one or more smart home devices 312. User device 308 and smart home controller 310 communicate with service infrastructure 300 via an API gateway 302. In various embodiments, service infrastructure 300 and its associated smart home support system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 and smart home controller 310 connect with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like smart home support system 306. API gateway 302 receives service requests issued by client applications, and creates service lookup requests based on service requests. As a non-limiting example, in an embodiment, the user device 308 includes software, such as a web browser or smart home application, that includes a graphical user interface that depicts information about one or more of the smart home devices 312 that is provided to the smart home support system 306 by the smart home controller 310.

In some embodiments, the user device 308 includes software, such as a web browser or smart home application, that includes a graphical user interface that allows the user to remotely operate one or more of the smart home devices 312. For example, the user device 308 may include a smart home application that allows the user to turn lights on or off, change the temperature setting on a thermostat, or remotely view images captured by a camera. In some embodiments, the application on the user device 308 converts a user input into a smart home command and transmits the command to the smart home support system 306, which in turn relays the command to the smart home controller 310, which then controls the one or more smart home devices 312 according to the received command.

In some embodiments, the smart home support system 306 enhances the operation of the smart home controller 310. For example, in some embodiments, the smart home support system 306 provides extra processing power for training a machine-learning model according to a model, training data, and/or various associated command data received from the smart home controller 310. As another example, in some embodiments, the smart home support system 306 provides extra storage space for training data, data backup, or other data storage needs for the smart home controller 310 according to various associated command data received from the smart home controller 310.

In some embodiments, the service infrastructure 300 includes one or more instances of the smart home support system 306. In some such embodiments, each of the multiple instances of the smart home support system 306 run independently on multiple computing systems. In some such embodiments, smart home support system 306, as well as other service instances of smart home support system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
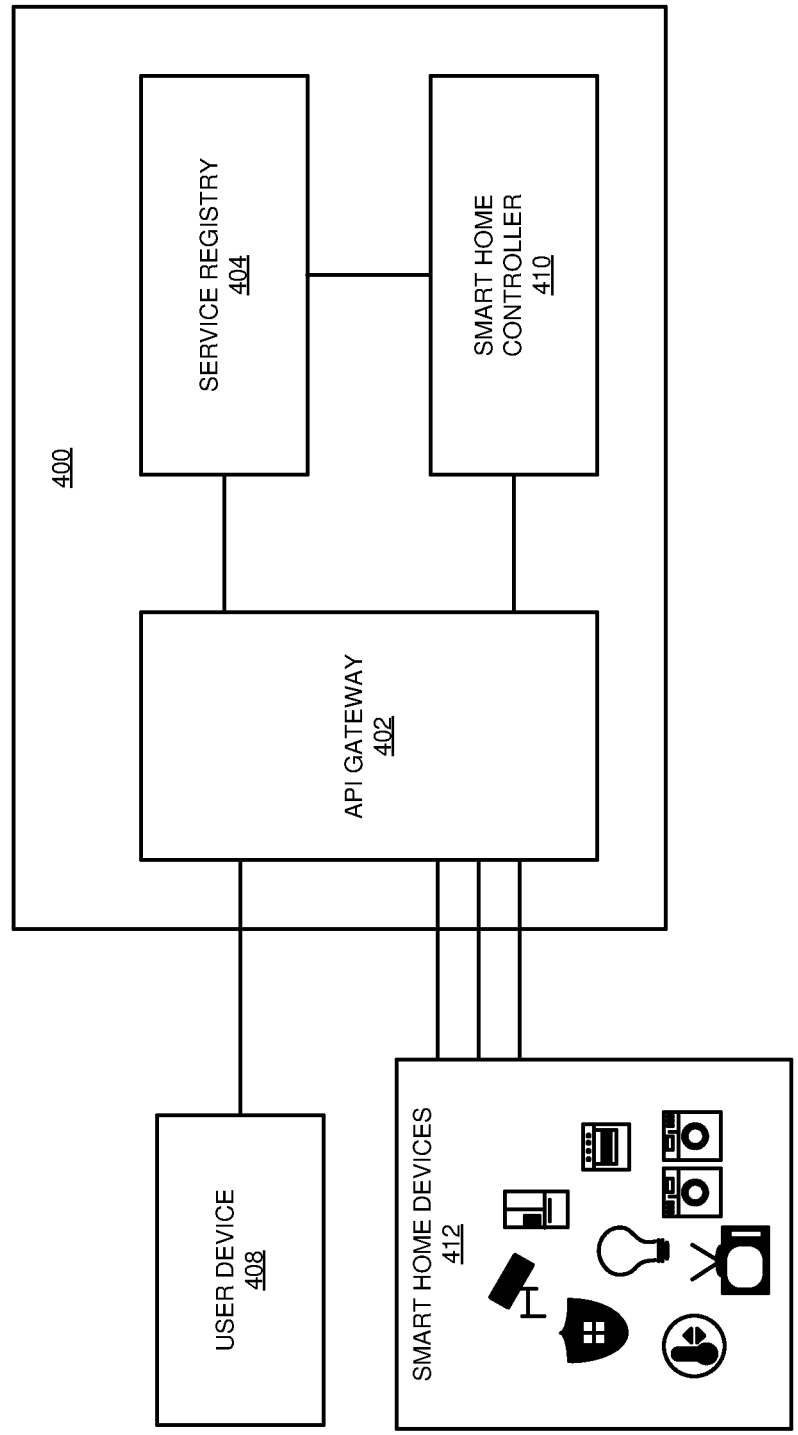
FIG. 4 depicts a block diagram of an example service infrastructure that includes a cloud-based smart home controller in accordance with an illustrative embodiment.

With reference to FIG. 4, this figure depicts a block diagram of an example service infrastructure 400 that includes a cloud-based smart home controller 410 in accordance with an illustrative embodiment. In some embodiments, the smart home controller 410 is deployed in workloads layer 90 of FIG. 2. Thus, the primary difference between the example service infrastructure 400 shown in FIG. 4 and the example service infrastructure 300 shown in FIG. 3 is that the example service infrastructure 400 shown in FIG. 4 includes a cloud-based smart home controller 410 in place of the local smart home controller 310 of FIG. 3.

In the illustrated embodiment, the service infrastructure 400 provides services and service instances to a user device 408 and to a one or more smart home devices 412. User device 408 and smart home devices 412 communicate with service infrastructure 400 via an API gateway 402. In various embodiments, service infrastructure 400 and its associated smart home controller 410 serve multiple users and multiple tenants. A tenant is a group of users (e.g., a company) who share a common access with specific privileges to the software instance. Service infrastructure 400 ensures that tenant specific data is isolated from other tenants.

In some embodiments, user device 408 and smart home devices 412 connect with API gateway 402 via any suitable network or combination of networks such as the Internet, etc. and use any suitable communication protocols such as Wi-Fi, Bluetooth, etc. Service infrastructure 400 may be built on the basis of cloud computing. API gateway 402 provides access to client applications like smart home controller 410. API gateway 402 receives service requests issued by client applications, and creates service lookup requests based on service requests. As a non-limiting example, in an embodiment, the user device 408 includes software, such as a web browser or smart home application, that includes a graphical user interface that depicts information about one or more of the smart home devices 412 that is provided to the smart home controller 410 by the smart home devices 412.

In some embodiments, the user device 408 includes software, such as a web browser or smart home application, that includes a graphical user interface that allows the user to remotely operate one or more of the smart home devices 412. For example, the user device 408 may include a smart home application that allows the user to turn lights on or off, change the temperature setting on a thermostat, or remotely view images captured by a camera. In some embodiments, the application on the user device 408 converts a user input into a smart home command and transmits the command to the smart home controller 410, which in turn relays the command to the appropriate one or more of the smart home devices 412 according to the command received from the user device 408.

In some embodiments, the smart home controller 410 enhances the operation of one or more of the smart home devices 412. For example, in some embodiments, the smart home controller 410 provides extra processing power for training a machine-learning model according to a model, training data, and/or various associated command data received from one or more of the smart home devices 412. As another example, in some embodiments, the smart home controller 410 provides extra storage space for training data, data backup, or other data storage needs for one or more of the smart home devices 412 according to various associated command data received from the smart home devices 412.

In some embodiments, the service infrastructure 400 includes one or more instances of the smart home controller 410. In some such embodiments, each of the multiple instances of the smart home controller 410 run independently on multiple computing systems. In some such embodiments, smart home controller 410, as well as other service instances of smart home controller 410, are registered in service registry 404.

In some embodiments, service registry 404 maintains information about the status or health of each service instance including performance information associated each of the service instances. For example, such performance information may include several types of performance characteristics of a given service instance (e.g., cache metrics, etc.). In some embodiments, the extended service registry 404 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 5:
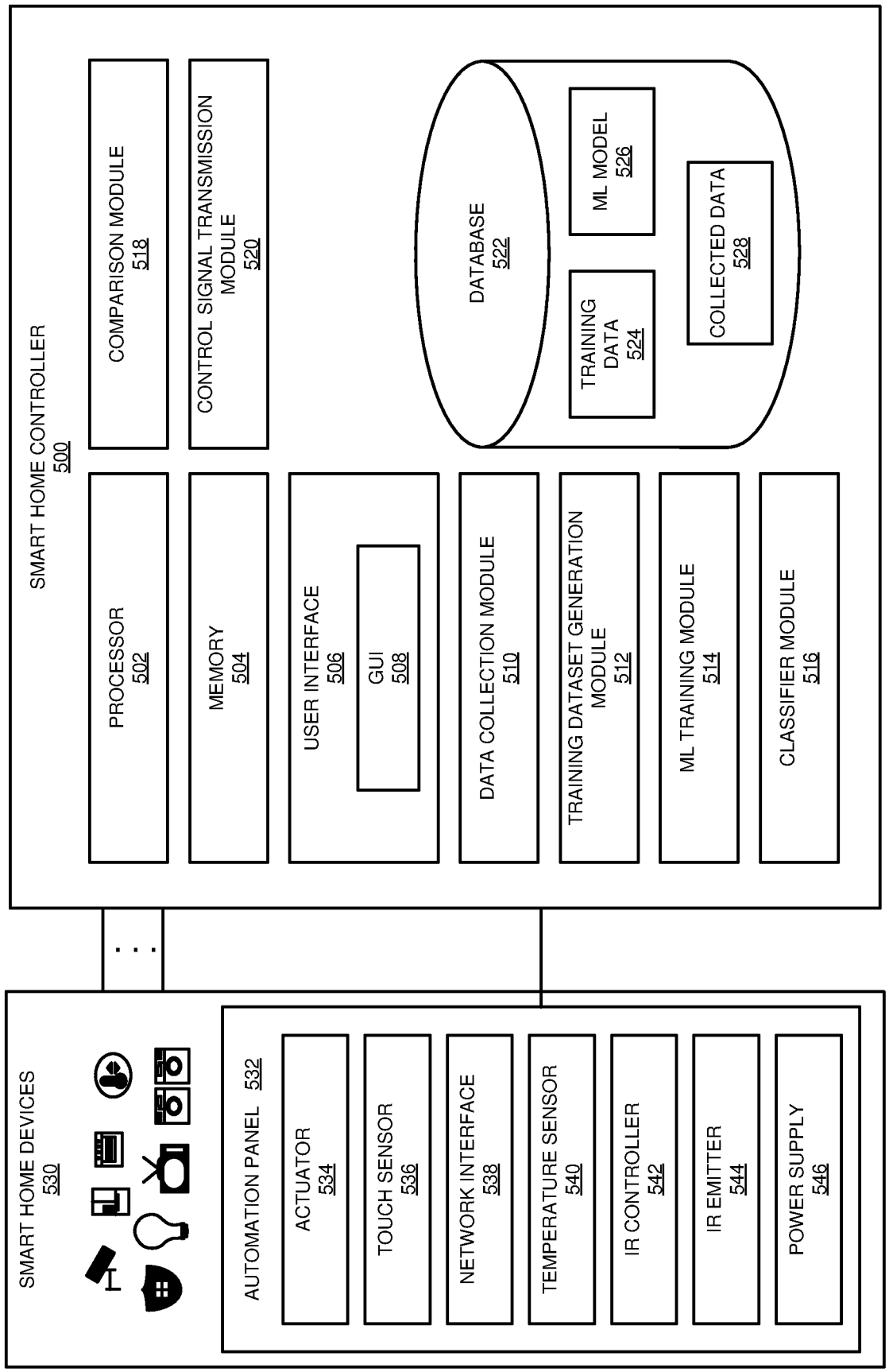
FIG. 5 depicts a block diagram of an example smart home controller in accordance with an illustrative embodiment.

With reference to FIG. 5, this figure depicts a block diagram of an example smart home controller 500 in accordance with an illustrative embodiment. In a particular embodiment, the smart home controller 500 is an example of the smart home controller 310 of FIG. 3 or the smart home controller 410 of FIG. 4.

In some embodiments, the smart home controller 500 includes a processor 502, memory 504, a user interface 506 that includes a graphical user interface (GUI) 508, a data collection module 510, a training dataset generation module 512, an ML training module 514, a classifier module 516, a comparison module 518, a control signal transmission module 520, and a database 522 that stores various data, such as training data 524, an ML classification model 526, and collected data 528 (including collected state data and sensor data discussed below). In alternative embodiments, the smart home controller 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processing unit ("processor") 502 performs various computational and data processing tasks, as well as other functionality. The processing unit 502 is in communication with memory 504. In some embodiments, the memory 504 comprises one or more computer readable storage media with program instructions collectively stored on the one or more computer readable storage media, with the program instructions being executable by one or more processors 502 to cause the one or more processors 502 to perform operations described herein.

In the illustrated embodiment, the user interface 506 provides a point of human interaction with the smart home controller 500. For example, in the illustrated embodiment, the user interface 506 communicates with one or more smart home devices 530 via a wired or wireless connection that may include a local area network (LAN), wide area network (WAN), the Internet, or other form of computer network. In the illustrated embodiment, the user interface 506 includes a GUI 508, which a user uses to give commands or to enter information (e.g., by typing using a keyboard, clicking using a mouse, etc.) via a display screen. In some embodiments, the data collection module 510 begins data collection for training a new smart home device 530 (or retraining an existing smart home device 530) based on information provided by a user via GUI 508.

In some embodiments, the GUI 508 includes device preference functionality that provides a user the ability to register any number of smart home devices 530 along with preferences, baselines, configurations, thresholds, etc., for the smart home controller 500 to leverage during operation. In some embodiments, the information collected from a user via the GUI 508 is stored the database 522 (or another computer memory) where this information can be stored hierarchically, relationally, and/or using any other solution that is now known or later developed. In addition, the smart home controller 500 can identify any smart home devices 530 that may exist or later join the network. Once such an identification has been made, the smart home controller 500 can further be used to configure relationships between the new smart home device 530 and the smart home controller 500.

In the illustrated embodiment, the smart home controller 500 is a controller of one or more smart home devices 530 (or Internet of Things (IoT) devices) in a particular location, such as a home or office. In some embodiments, the smart home controller 500 acts as a management "hub" of information for smart home devices 530. The smart home devices 530 include various IoT types of devices that can be connected to the Internet or a device controller and enable functions and/or services for a user. Examples include, but are not limited to, fireplaces, external faucets, and/or other devices such as large appliances (e.g., a refrigerator, a dishwasher, a washing machine, a dryer, and/or the like); small appliances (e.g., a toaster, a toaster oven, a microwave, a mixer, a blender, and/or the like); entertainment devices (e.g., a television, a radio, a media player, a gaming system, and/or the like); cleaning devices (e.g., a vacuum cleaner, an air purifier, and/or the like); climate control systems (e.g., a thermostat, a heater, a fan, an air conditioner, and/or the like); lighting systems (e.g., a lamp, a light fixture, a light switch, and/or the like); measuring devices (e.g., a clock, a scale, a thermometer, and/or the like); and/or any member of the internet of things that is now known or later developed.

In the illustrated embodiment, the smart home controller 500 includes a classifier module 516 that constantly evaluates information (e.g., in real time or near-real time) provided from smart home devices 530 and other data feed sources (e.g., weather data, traffic data, sunrise/sunset data, time of day data, etc.) in order to detect device patterns among the smart home devices 530 and/or changes which might indicate an event (e.g., a change in a location of a user, a change in weather, a change in network traffic, etc.) that can trigger a response including modifying a function of one or more smart home devices 530, modifying a function of a smart home controller 500, transmitting alert message to a user, etc. For example, in some embodiments, the control signal transmission module 520 is triggered depending on the output of the comparison module 518, which compares an actual state to a predicted state of one or more of the smart home devices 530, where the predicted state is predicted by the classifier module 516. An example smart home controller 500 a home automation application used to control smart home devices 530 in the home for lighting control, HVAC (heating, ventilation, and air conditioning), outdoor lawn irrigation, appliances, security systems, and/or the like. For example, all accounts from a smart television may be logged off when it is determined by one or more smart home devices 530 that all users have left the house.

In illustrative embodiments, the smart home devices 530 include an automation panel 532, which serves as an example of a retrofit device in accordance with an illustrative embodiment that has been fitted to a legacy device. In some embodiments, the automation panel 532 includes an actuator 534, a touch sensor 536, a network interface 538, a temperature sensor 540, an IR controller 542, an IR emitter 544, and a power supply 546. In alternative embodiments, the automation panel 532 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the automation panel 532 is an automation panel that has been retrofitted to an existing legacy control device, such as a legacy light switch that has a manual toggle or rocker switch as a control element. In the illustrated embodiment, the automation panel 532 comprises a touch sensor 536 that senses manual actuation of the control element, and an actuator 534 that automatically actuates the control element in response to a specified control signal from the control signal transmission module 520. In some embodiments, the automation panel 532 includes a network interface 538 that provides for communication with the smart home controller 500. It will be appreciated that there are many possible networking protocols and techniques that may be implemented, for example using wired or wireless communications, including Wi-Fi or Bluetooth communications (BLUETOOTH® is a registered trademark of Bluetooth SIG, Inc., Kirkland, Wash., U.S.A.).

In some embodiments, the data collection module 510 collects state data indicative of an actuation state of the control element of the control device that has been retrofitted with the automation panel 532. For example, In some embodiments, the automation panel 532 infers the actuation state of the control element based on detected touch inputs via the touch sensor 536 that senses touches by users when the users manually operate the control element.

In some embodiments, the data collection module 510 also collects context data indicative of environment and other conditions at the time the state data is collected. In some embodiments, the context data represents context information collected from one or more sensors and reference data from other sources of information. For example, in a typical usage scenario, the context data includes sensor data from one or more sensors, which may include any combination of sensors included with the automation panel 532 and/or other separate sensors. In the illustrated embodiment, the automation panel 532 includes a temperature sensor 540 that may provide data indicative of an ambient air temperature to the data collection module 510 as part of the context data.

In alternative embodiments, the automation panel 532 may also, or alternatively, include other sensors such as a motion sensor, light sensor, vibration sensor, and/or microphone. In some embodiments, sensors such as a motion sensor, microphone, and/or vibration sensor may provide context data indicative of whether a person is present. A light sensor data may provide context data indicative of an ambient light level. In embodiments in which the automation panel 532 does not include one or more of these sensors, these sensors may be present elsewhere in the smart home environment and may provide such sensor data as context data to the data collection module 510. In addition to sensor data, the data collection module 510 may also receive reference data, for example time and/or date data indicative of a time and/or date when the sensor data is collected, weather data indicative of weather conditions, or any other data that may contribute factors that a machine learning classifier should consider when determining whether to turn a light on or off, adjust a thermostat setting, or perform some other action associated with another type of control element. In some embodiments, the context data includes sensor data that is collected from a combination of sensors that include one or more sensors that are included in an automation panel 532 and one or more sensors that separate from the automation panel 532.

As an example, in some embodiments, the context data includes sensor data indicative of an environmental property affected by a state of a system that is altered by actuation of the control element of a control device, and stores the collected data as collected data 528 in the database 522. For example, in some embodiments, the control device is a light switch, the control element is the switching portion of a light switch, the environmental property is an ambient light level, actuation of the control element alters a state of a system (i.e., a lighting system is turned on or off), and the state of the system affects an environmental property (i.e., the ambient light level is higher when the lighting system is on and is lower when the lighting system is off). As another example, in some embodiments, the control device is a remote control for an HVAC system, the control element is a button on the HVAC remote control, the environmental property is an ambient air temperature, actuation of the control element alters a state of a system (i.e., an HVAC temperature setting is changed), and the state of the system affects an environmental property (i.e., the ambient temperature changes due to the change to the HVAC temperature setting).

In the illustrated embodiment, the training dataset generation module 512 fetches the collected data 528 from the database 522. The training dataset generation module 512 then processes the collected data 528 into a format that can be used to train a machine learning classifier. For example, In some embodiments, the training dataset generation module 512 utilizes the collected data 528 to generate data sets for a feature set by applying confidence level and bias on feature sets. In an embodiment, training dataset generation module 512 creates a data set for a plurality of variances of a feature set. In an embodiment, the training dataset generation module 512 incorporates one or more context data variations as features that are correlated with state data values, with context data variations being provided on either side of an ON/OFF state boundary. In some embodiments, the distance from this boundary is used to establish a confidence value or confidence percentage. In some embodiments, the training dataset generation module 512 utilizes linear regression analysis for every input variation to calculate which variations are within a confidence threshold (e.g., 90% confidence) of the boundary. Context data sets that exceed a confidence threshold (e.g., 90%) are marked as being indicative of the state for that side of the boundary. While the use of linear regression is suitable for binary classifier training data, various embodiments may use any classification modelling technique, such as a deep learning model, decision tree or other tree-based model, or other machine learning technique. For example, some embodiments involving more than two classes of distinction use logistic regression, particularly for generating classification data. Thus, the training dataset generation module 512 generates a series of labeled datasets that correlate sensor data to state data. The training dataset generation module 512 then stores the training data as training data 524 in the database 522.

In the illustrated embodiment, the ML training module 514 trains a machine-learning classification model 526 using the training dataset 524. In the illustrated embodiment, the ML training module 514 trains the ML classification model 526 to output a predicted actuation state of the control element based on inputted context data. The ML training module 514 then stores the trained ML classification model 526 in the database 522.

In the illustrated embodiment, the smart home controller 500 deploys the thus trained machine-learning classification model 526 to process current context data (i.e., context data in real time or near real time). Once deployed, the ML classification model 526 outputs a predicted actuation state of the control element based on inputted context data. The ML classification model 526 outputs the prediction to the comparison module 518. The comparison module 518 compares the predicted actuation state from the ML classification model 526 to an actual actuation state. If the actual actuation state does not match the predicted actuation state, the comparison module 518 interprets this difference as a mismatch between the predicted actuation state and the actual actuation state. In some embodiments, the comparison module 518 waits for a predetermined number of consecutive differences between the actual actuation state and the predicted actuation state, or waits for differences to exist for a predetermined amount of time, before considering a mismatch. By waiting for different results to be present for several cycles or for a length of time, the comparison module 518 prevents transient conditions from triggering undesired actuations of the control element, for example which could result in undesirably frequent cycling of the actuation state of the control element. In some embodiments, when the comparison module 518 determines that a mismatch condition is present, it issues a mismatch notification to the control signal transmission module 520.

In the illustrated embodiment, when the control signal transmission module 520 receives a mismatch notification from the comparison module 518, the control signal transmission module 520 generates a control signal appropriate for triggering actuation of the control element. For example, in some embodiments, the control signal transmission module 520 may be a module of a smart home controller 500 for a plurality of different smart home devices 530, which may include one or more automation panels 532 that are retrofitted to respective control devices each having a control element that responds to respective different control signals. In some such embodiments, the control signal transmission module 520 determines the correct control signal for actuating the control element that is in a mismatch condition, for example by fetching control signal data from a lookup table. The control signal transmission module 520 then transmits the specified control signal to the control element that has the detected mismatch condition, and thereby causes the actuation of that control element.

In the illustrated embodiment, the database 522 is stored on a computer readable storage medium and is used to store persistent data for the smart home controller 500. For example, the database 522 includes training data 524, a machine learning model 526, and data collected by the data collection module 510 as collected data 528.

In some embodiments, the automation panel 532 includes an IR controller 542 and an IR emitter 544 that transmit remote-control signals to an HVAC system. In some such embodiments, the ML classification model 526 is also trained to predict HVAC settings. Once in runtime, if the comparison module 518 detects a mismatch between a current temperature setting and a temperature setting predicted by the classifier module 516, it issues a mismatch notification to the control signal transmission module 520. In some embodiments, when the control signal transmission module 520 receives a mismatch notification from the comparison module 518, the control signal transmission module 520 generates a control signal appropriate for triggering the IR controller 542 to control the IR emitter 544 to issue a signal to the HVAC system to adjust the temperature setting to the predicted value. In some such embodiments, the control signal transmission module 520 determines the correct control signal for activating the IR controller 542, for example by fetching control signal data from a lookup table. The control signal transmission module 520 then transmits the specified control signal to the control element that has the detected mismatch condition, and thereby causes the adjustment of the temperature settings.

In some embodiments, the automation panel 532 includes a power supply 546. For example, in some embodiments, the power supply 546 may include a battery, a solar panel, or a connection to an external power source.

Figure 6:
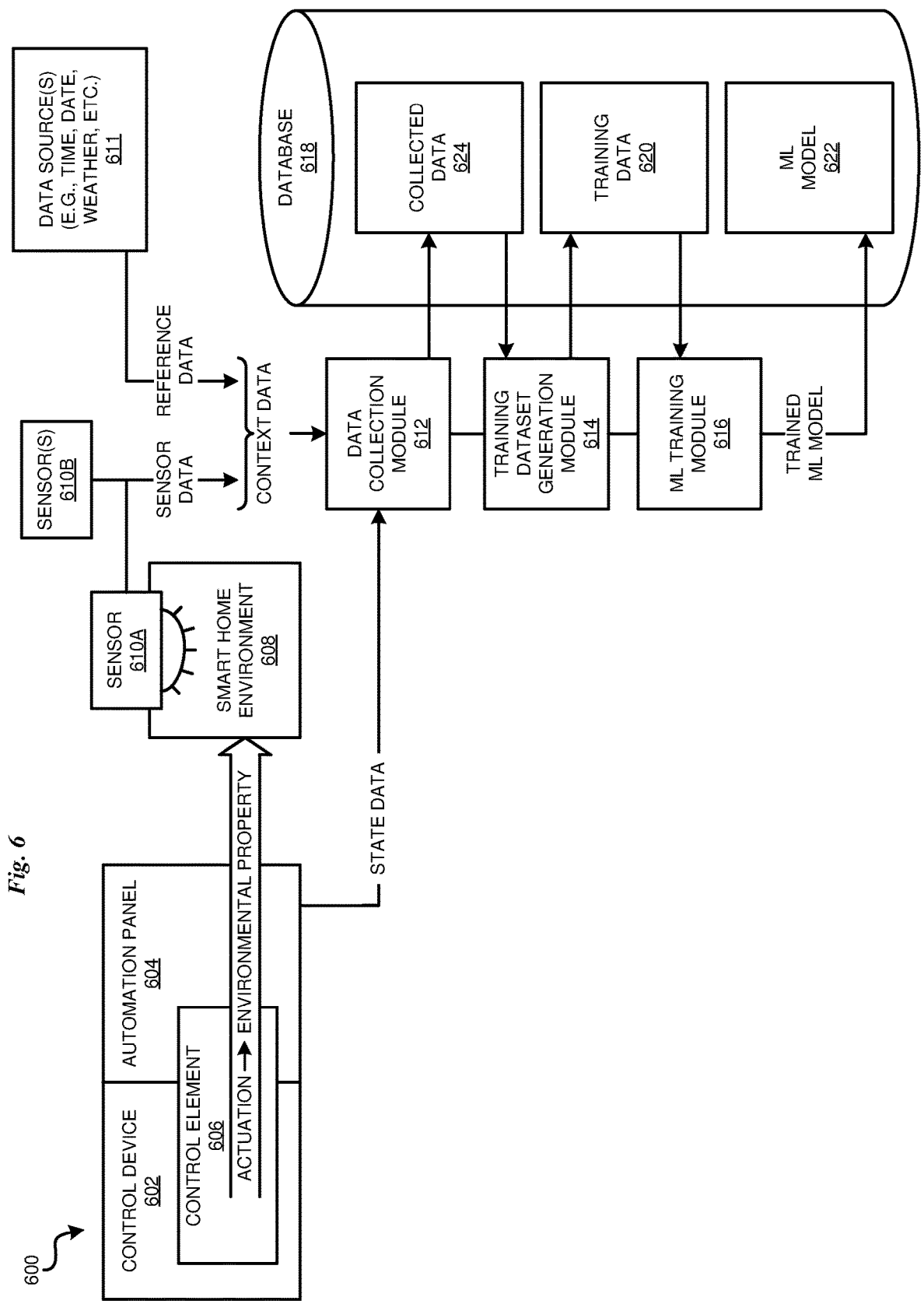
FIG. 6 depicts a block diagram of an example machine learning (ML) training system in accordance with an illustrative embodiment.

With reference to FIG. 6, this figure depicts a block diagram of an example machine learning (ML) training system 600 in accordance with an illustrative embodiment. In a particular embodiment, the ML training system 600 includes exemplary components of the smart home controller 500 of FIG. 5.

In the illustrated embodiment, a ML training module 616 is training a ML model 622 to predict a desired actuation state of a control element 606 of a legacy control device 602 that has been retrofitted with an automation panel 604. As discussed in greater detail below, the automation panel 604 includes an actuator that is configured to operate the control element 606 in response to a particular specified control signal. In some embodiments, if the trained ML model 622 predicts a state that is different that the current state of the control element 606, the specified control signal is used to activate the actuator of the automation panel 604 to move the control element to the predicted state.

In the illustrated embodiment, the ML training module 616 trains the ML model 622 using training data 620 that is generated by the training dataset generation module 614 from the collected data 624 that is collected by the data collection module 612. The data collection module 612 collects state data indicative of the actuation state of the control element 606 of the control device 602 that has been retrofitted with the automation panel 604. For example, in some embodiments, the automation panel 604 infers the actuation state of the control element 606 based on detected touch inputs via a touch sensor (e.g., touch sensor 536 of FIG. 5) that senses touches when users manually operate the control element 606.

In the illustrated embodiment, the data collection module 612 also collects context data indicative of environment and other conditions at the time the state data is collected. The context data includes sensor data collected from sensors 610A and 610B and reference data from one or more other data sources 611. For example, in a typical usage scenario, the sensor 610A may be a motion sensor configured to detect when a user is present in the smart home environment 608. Additional sensor(s) 610B may include any combination of sensors, such as a temperature sensor that provides data indicative of an ambient air temperature and/or a light sensor that provides that provides data indicative of an ambient light level.

In some embodiments, the data collection module 612 may also receive reference data that is relevant to the classification model. For example, in an exemplary embodiment the data collection module 612 collects light sensor data indicative of the ambient light level in a smart home environment 608 and motion sensor data indicative of a person being present in the smart home environment 608 and uses this data to train a ML model 622 to identify when a light switch (control element 606) should be turned on or off. In some implementations, it may be beneficial for the ML model 622 to consider additional factors that can be determined from reference data. For example, calendar data indicating the time of day and/or the day of the year may impact the amount of sunlight entering the smart home environment 608. Weather data indicating sunny or cloudy conditions may also impact the amount of sunlight entering the smart home environment 608. Schedule data indicating the user will be traveling away from the smart home environment 608 or indicating that the user has an event planned at the smart home environment 608 may impact an ordinary schedule and alter the typical times when light is needed in the smart home environment 608. Calendar, weather, and schedule data are all non-limiting examples of reference data that may alter whether a light controlled by the control element 606 should turned on or off. It will be appreciated that there are many other types of reference data that could also or alternatively be used in further embodiments.

Also, while the above example involves a light source that is controlled by the control element 606, the disclosed concepts are equally applicable to other types of devices or systems. For example, as mentioned above, in some embodiments, the control device 602 is a remote control for an HVAC system, the control element 606 is a button on the HVAC remote control, the environmental property of the smart home environment 608 is an ambient air temperature, actuation of the control element 606 alters a state of a system (i.e., an HVAC temperature setting is changed), and the state of the system affects an environmental property of the smart home environment 608 (i.e., the ambient air temperature in the of the smart home environment 608 changes due to the change to the HVAC temperature setting). In such embodiments, the above examples of calendar, weather, and schedule data are all non-limiting examples of reference data that may alter whether a temperature setting controlled by the control element 606 should be changed. It will be appreciated that there are many other types of reference data that could also or alternatively be used in further embodiments.

In the illustrated embodiment, after the data collection module 612 has received and stored the 624 for some predetermined period of time, the training dataset generation module 614 fetches the collected data 624 from the database 618. The training dataset generation module 614 then processes the collected data 624 into a format that the ML training module 616 uses to train the ML model 622. For example, in some embodiments, the training dataset generation module 614 utilizes the collected data 624 to generate data sets for a feature set by applying confidence level and bias on feature sets. In an embodiment, training dataset generation module 614 creates a data set for a plurality of variances of a feature set. In an embodiment, the training dataset generation module 614 incorporates one or more context data variations as features that are correlated with state data values, with context data variations being provided on either side of a binary classification boundary, such as an ON/OFF state boundary in embodiment in which the control element 606 controls a light source. In some embodiments, the training dataset generation module 614 uses the distance from this classification boundary to establish a confidence value or confidence percentage. In some embodiments, the training dataset generation module 614 utilizes linear regression analysis for every input variation to calculate which variations are within a confidence threshold (e.g., 90% confidence) of the boundary. Context data sets that exceed a confidence threshold (e.g., 90%) are marked as being indicative of the state for that side of the boundary.

While the use of linear regression is suitable for binary classifier training data, various embodiments may use any classification modelling technique, such as a deep learning model, decision tree or other tree-based model, or other machine learning technique. For example, some embodiments involving more than two classes of distinction use logistic regression, particularly for generating classification data. Thus, the training dataset generation module 614 generates a series of labeled datasets that correlate sensor data to state data. The training dataset generation module 614 then stores the training data as training data 620 in the database 618.

In the illustrated embodiment, the ML training module 616 trains a ML classification model 622 using the training dataset 620. In the illustrated embodiment, the ML training module 616 trains the ML classification model 622 to output a predicted actuation state of the control element 606 based on inputted context data. The ML training module 616 then stores the trained ML classification model 622 in the database 618.

In the illustrated embodiment, the database 618 is stored on a computer readable storage medium and is used to store persistent data. For example, the database 618 includes collected data 624, training data 620, and a machine learning model 622.

Figure 7:
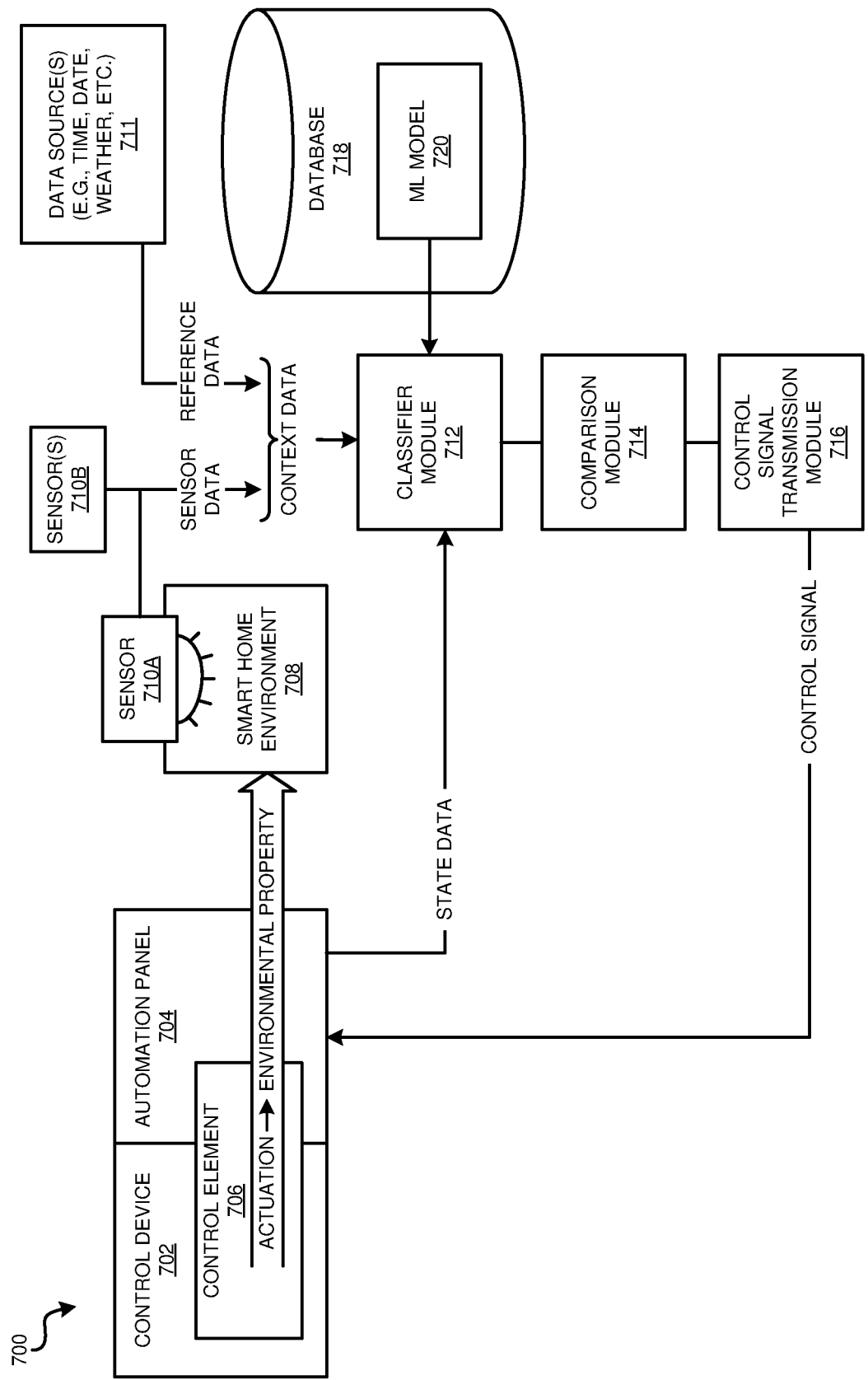
FIG. 7 depicts a block diagram of an example machine learning (ML) classification system in accordance with an illustrative embodiment.

With reference to FIG. 7, this figure depicts a block diagram of an example machine learning (ML) classification system 700 in accordance with an illustrative embodiment. In a particular embodiment, the ML classification system 700 includes exemplary components of the smart home controller 500 of FIG. 5.

In the illustrated embodiment, a classifier module 712 uses a trained ML model 720 (e.g., the trained ML model 622 of FIG. 6) to predict a desired actuation state of a control element 706 of a legacy control device 702 that has been retrofitted with an automation panel 704. As discussed in greater detail below, the automation panel 704 includes an actuator that is configured to operate the control element 706 in response to a particular specified control signal. In some embodiments, if the classifier module 712 predicts a state that is different from the current state of the control element 706, the specified control signal is used to activate the actuator of the automation panel 704 to move the control element 706 to the predicted state.

In the illustrated embodiment, the classifier module 712 receives state data from the automation panel 704 and context data indicative of environment and other conditions of the smart home environment 708 at the time the state data is collected. In the illustrated embodiment, the context data includes sensor data collected from sensors 710A and 710B and reference data from one or more other data sources 711. For example, in a typical usage scenario, the sensor 710A may be a motion sensor configured to detect when a user is present in the smart home environment 708. Additional sensor(s) 710B may include any combination of sensors, such as a temperature sensor that provides data indicative of an ambient air temperature and/or a light sensor that provides that provides data indicative of an ambient light level. In some embodiments, the classifier module 712 may also receive reference data that is relevant to the classification model, including reference data as discussed above in connection with FIG. 6.

In the illustrated embodiment, the classifier module 712 outputs a predicted actuation state of the control element 706 based on inputted context data. The Classifier module 712 outputs the prediction to the comparison module 714. The comparison module 714 compares the predicted actuation state from the classifier module 712 to an actual actuation state. If the actual actuation state does not match the predicted actuation state, the comparison module 714 interprets this difference as a mismatch between the predicted actuation state and the actual actuation state. In some embodiments, the comparison module 714 waits for a predetermined number of consecutive differences between the actual actuation state and the predicted actuation state, or waits for differences to exist for a predetermined amount of time, before considering a mismatch. By waiting for different results to be present for several cycles or for a length of time, the comparison module 714 prevents transient conditions from triggering undesired actuations of the control element 706, for example which could result in undesirably frequent cycling of the actuation state of the control element 706. In some embodiments, when the comparison module 714 determines that a mismatch condition is present, it issues a mismatch notification to the control signal transmission module 716.

In the illustrated embodiment, when the control signal transmission module 716 receives a mismatch notification from the comparison module 714, the control signal transmission module 716 generates a control signal appropriate for triggering actuation of the control element 706, for example by fetching control signal data from a lookup table. The control signal transmission module 716 then transmits the specified control signal to the control element 706 that has the detected mismatch condition, and thereby causes the actuation of that control element 706.

In the illustrated embodiment, the database 718 is stored on a computer readable storage medium and is used to store persistent data. For example, the database 718 includes a trained machine learning model 720.

Figure 8:
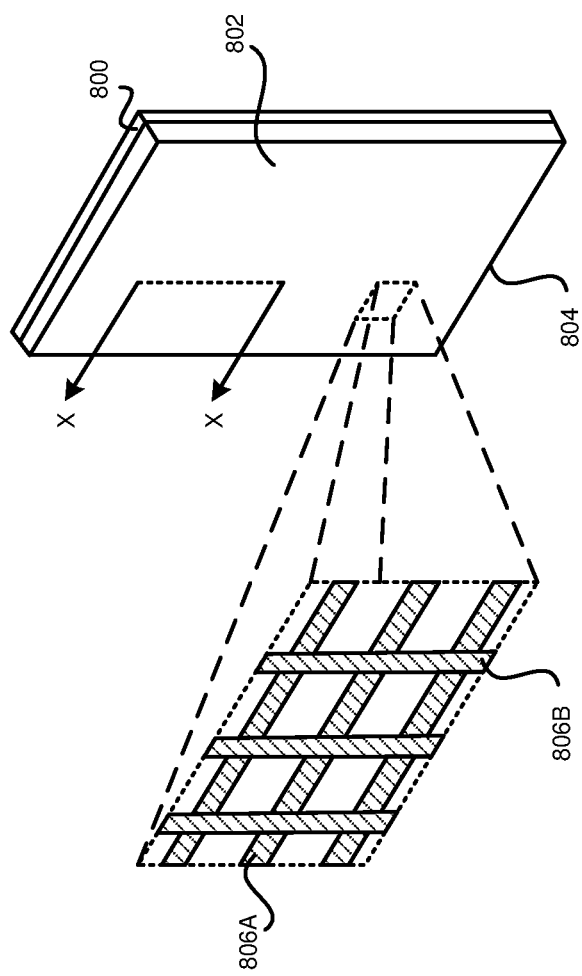
FIG. 8 depicts a perspective view of an example automation panel in accordance with an illustrative embodiment.

With reference to FIG. 8, this figure depicts a perspective view of an example automation panel 800 in accordance with an illustrative embodiment. In a particular embodiment, the automation panel 800 is an example of the automation panel 532 of FIG. 5, the automation panel 604 of FIG. 6, and/or the automation panel 704 of FIG. 7.

In the illustrated embodiment, the automation panel 800 is adapted and configured to be installed in engagement with existing user controllable fixtures present in a home, office, or other environment of interest, and to interact with the existing user controllable fixtures so as to operate and/or control them, thereby in turn controlling and/or operating one or more luminaires, appliances, and/or devices that interface with other existing user controllable fixtures. In some embodiments, the user controllable fixtures may include any of the many components and/or fixtures commonly found in a home, office, or other environment, such as, for example, light switches, light dimmers, rheostats, electrical receptacles, motor controls, thermostats, heating, cooling, and/or ventilation controls, intrusion, fire and/or other alarm controls, irrigation and/or sprinkler controls, drape, window, and/or shutter controls, door and window locks, and appliance controls.

In the illustrated embodiment, the automation panel 800 includes a multi-layered substrate 802 supported by a frame 804. In some embodiments, the substrate 802 may be a flat, deformable substrate. In alternative embodiments, the substrate 802 may be formed to conform to a certain shape for a particular implementation. For example, the substrate 802 may be shaped to conform to the outer shape of a toggle style or rocker style legacy light switch. In some embodiments, the substrate 802 includes a touch sensor, such as a digitizer or other known touch-sensing technology.

In some embodiments, the substrate 802 includes a touch sensor, such as the touch sensor layer 1202 of FIG. 12. In some embodiments, the touch sensor is a digitizer. In some such embodiments, the substrate 802 comprises a first array of electrodes 806A arranged substantially parallel with one another and a second array of electrodes 806B arranged substantially parallel with one another. In some implementations the electrodes 806A in the first array are row electrodes positioned substantially perpendicular to the electrodes 806B in the second array (column electrodes) to form a grid or matrix. While the row electrodes 806A may be referred to as transmit electrodes and the column electrodes 806B may be referred to as receive electrodes, these designations may be reversed with no change in meaning. However, it is not essential for the electrodes to be arranged in a grid. In some cases, the row electrodes 806A intersect each column electrode 806B at an angle that is not perpendicular thereby forming a sensor having the form of a parallelogram. In some cases, the electrodes form a more complex pattern in which any two rows or columns are not necessarily parallel, or not necessarily laid out along straight lines. In some cases, the electrodes are formed as pads rather than elongate electrodes.

In some embodiments, the electrodes 806A, 806B are substantially transparent to visible wavelengths of light. Specifically, the electrodes 806A, 806B in the touch sensor are made from transparent conductive material (for example, indium tin oxide), or alternatively, are made from opaque material but with traces so small as to be inconspicuous. The touch sensor of the substrate 802 is used to measure the capacitance from each row of electrodes 806A to each column of the electrodes 806B in order to measure the position of an input medium such as a finger or stylus.

Figure 9:
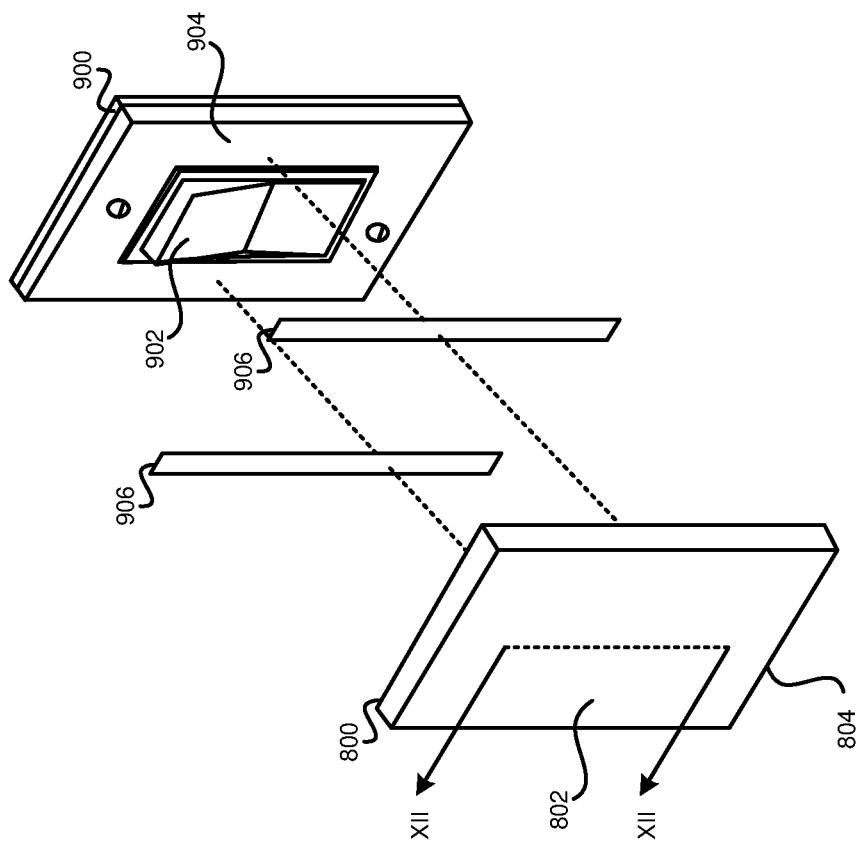
FIG. 9 depicts an exploded view of the automation panel retrofitted to a legacy control device in accordance with an illustrative embodiment.

With reference to FIG. 9, this figure depicts an exploded view of the automation panel 800 retrofitted to a legacy control device 900 in accordance with an illustrative embodiment. In the illustrated embodiment, the legacy control device 900 is a rocker-style light switch assembly having a rocker switch 902 that is electrically connected to control the ON and OFF state of one or more luminaires or other light source(s). It will be appreciated that the disclosed concepts are equally applicable to other types or styles of legacy control devices.

In the illustrated embodiment, the legacy control device 900 includes a wall plate 904 (also known as a cover plate or receptacle plate) such as the type that is typically installed over a legacy wall switch. The term receptacle box refers to any electrical junction box used for electrical wiring connections, including but not limited to electrical switches, electrical power outlets, electrical lights, electrical ceiling fans, telephone jacks, speaker wire outlets, antenna wire outlets, and cable-TV or data outlets. The term wall refers to walls, floors, and ceilings.

The wall plate 904 traditionally serves both an aesthetic function and a safety function. The wall plate 904 serves an aesthetic function by covering portions of an outlet box in which the wall switch is typically installed. The wall plate 904 serves a safety function by blocking access to exposed wires, terminals, and other exposed elements that may be carrying an electrical current.

Removing the wall plate 904 and the legacy control device 900 to replace it with a smart home device circumvents the measure of safety that the wall plate 904 otherwise provides. The disclosed automation panel 800 overcomes this problem by providing a way to add smart-home functionality to the legacy control device 900 without the need to remove the wall plate 904 or other elements of the legacy control device 900. Instead, the automation panel 800 can be installed by attaching it to the exposed outer-facing side of the legacy control device 900. In the illustrated embodiment, adhesive or double-sided tape 906 is used to attach the automation panel 800 to the legacy control device 900, however, other attachment techniques may be used. In some embodiments, the frame 804 is formed of molded thermoplastic resin, but can be molded or die-cut and made of thermoplastic resin, metal, foam, paper, cork, or other suitable material shaped to coincide with the outer exposed shape of the legacy control device 900.

With reference to FIG. 10, this figure depicts a cross-sectional view 1000 taken across section line X-X of the automation panel 800 of FIG. 8. More specifically, the view 1000 shows layers of the substrate 802 of FIG. 8. In the illustrated embodiment, the layers include a touch sensor layer 1002 that senses manual actuation of a control element of a retrofitted control device (e.g., rocker switch 902 of legacy control device 900) and an actuator layer 1004 that automatically actuates the control element in response to a specified control signal.

In the illustrated embodiment, the touch sensor layer 1002 comprises any of several known touch-sensor substrates that output a signal (indicated as D_OUT) indicative of a position where a touch occurs on the layer 1002. In some embodiments, the touch sensor layer 1002 is an example of the touch sensor layer 1202 of FIG. 12 and includes electrodes 806A, 806B of FIG. 8.

In the illustrated embodiment, the actuator layer 1004 is a composite layer that includes a first piezoelectric ceramic layer 1006A and a second piezoelectric ceramic layer 1006B and deflects in a transvers direction under an applied voltage (e.g., the difference between V+ and V− in FIG. 10). In some embodiments, the piezoelectric ceramic layers are formed of Lead Zirconate Titanate (PZT).

In some embodiments, the substrate 1002 includes additional layers, such as optional layer 1006C (described below) and other layers that are not shown for the sake of clarity. For example, in some embodiments, the piezoelectric ceramic layers 1006A, 1006B include electroplating layers on or more surfaces that serve as electrodes that facilitate the attachment of electrical conductors, such as wires or the like, that supply control voltages to the actuator layer 1004. Also, in some embodiments, there may be adhesive layers between any of the layers that bonds the layers together.

With reference to FIG. 11, this figure depicts a schematic block diagram of an example of actuator deflection in accordance with an illustrative embodiment. In FIG. 11, the actuator layer 1004 of FIG. 10 and the control signal transmission module 716 of FIG. 7 are shown together in isolation from other components for the sake of clarity.

In the illustrated embodiment, the actuator layer 1004 comprises piezoelectric material that develops an electric field when placed under stress or strain. The electric field developed by piezoelectric material is a function of the applied force and displacement causing the mechanical stress or strain. Conversely, piezoelectric material undergoes dimensional changes in an applied electric field. The dimensional change (i.e., expansion or contraction) of piezoelectric material is a function of the applied electric field. Piezoelectric material is therefore used as an actuator due to its propensity to deform under such electric fields.

Embodiments of the actuator layer 1004 may include a piezoelectric actuator configured as a direct or indirect mode actuator that makes use of a change in the dimensions of the piezoelectric material to achieve a displacement. Embodiments that include a direct mode piezoelectric actuator include a piezoelectric ceramic plate (or stack of plates) sandwiched between a pair of electrodes formed on opposing major surfaces. The direct mode piezoelectric actuators generally have a sufficiently large piezoelectric coefficient to produce the desired strain in the ceramic plate(s). However, direct mode actuators generally achieve a small displacement (strain), for example a few tenths of a percent of the total thickness of the piezoelectric material in the actuator layer 1004.

Embodiments that include an indirect mode piezoelectric actuator exhibit greater displacement than is achievable with direct mode actuators by achieving strain amplification via an external structure, such as a metallic shell, stressed plastic, fiberglass, or similar structures. The actuator movement of an indirect mode piezoelectric actuator occurs as a result of expansion in the piezoelectric material which mechanically couples to an amplified contraction in the transverse direction. In some embodiments, an indirect mode piezoelectric actuator exhibits several orders of magnitude greater displacement than direct mode piezoelectric actuators.

Embodiments of the actuator layer 1004 that include an indirect mode piezoelectric actuator may be constructed as "unimorph" or "bimorph" actuators. In an alternative unimorph embodiment, the actuator layer 1004 includes a piezoelectric ceramic layer 1006A and pre-stress layer 1006B in place of the second piezoelectric layer. In some such embodiments, the pre-stress layer 1006B comprises spring steel, stainless steel, beryllium alloy, aluminum or other flexible substrate (such as metal, fiberglass, carbon fiber, composites, or plastic). The addition of the pre-stress layer results deflection normal to the plane of the piezoelectric layer 1006A when electrically energized as high as 10% of the thickness of the piezoelectric material.

In other alternative embodiments, the actuator layer 1004 comprises a bimorph actuator that includes an intermediate pre-stress layer 1006C between the piezoelectric layers 1006A and 1006B. In some such embodiments, electrodes are bonded to each of the major surfaces of the piezoelectric layers 1006A and 1006B and the pre-stress layer 1006C is bonded to the inner two electrodes. Embodiments that include a bimorph actuator exhibit more displacement than comparable unimorph actuators because, under the applied voltage, one piezoelectric layer 1006A will contract while the other piezoelectric layer 1006B expands, allowing for transverse bending of up to 20% of the thickness of the piezoelectric material.

The actuator layer 1004 is electrically connected to control signal transmission module 716. In some embodiments, the control signal transmission module 716 delivers a specified control signal to the actuator layer 1004 in which the specified control signal comprises a particular voltage level and polarity. In the illustrated embodiment, the polarity of the applied voltage controls the direction of displacement of the actuator layer 1004. As a result, the control signal $T_1$, which has a first polarity, causes the actuator layer 1004 to bend in a first direction, and the control signal $T_2$, which has a second polarity that is opposite that of the first polarity, causes the actuator layer 1004 to bend in a second direction that is opposite that of the first direction. Also, the magnitude of the voltage applied by the control signal transmission module 716 controls the extent of the deflection of the 7004, where higher voltage levels cause greater deflection.

Figure 12A:
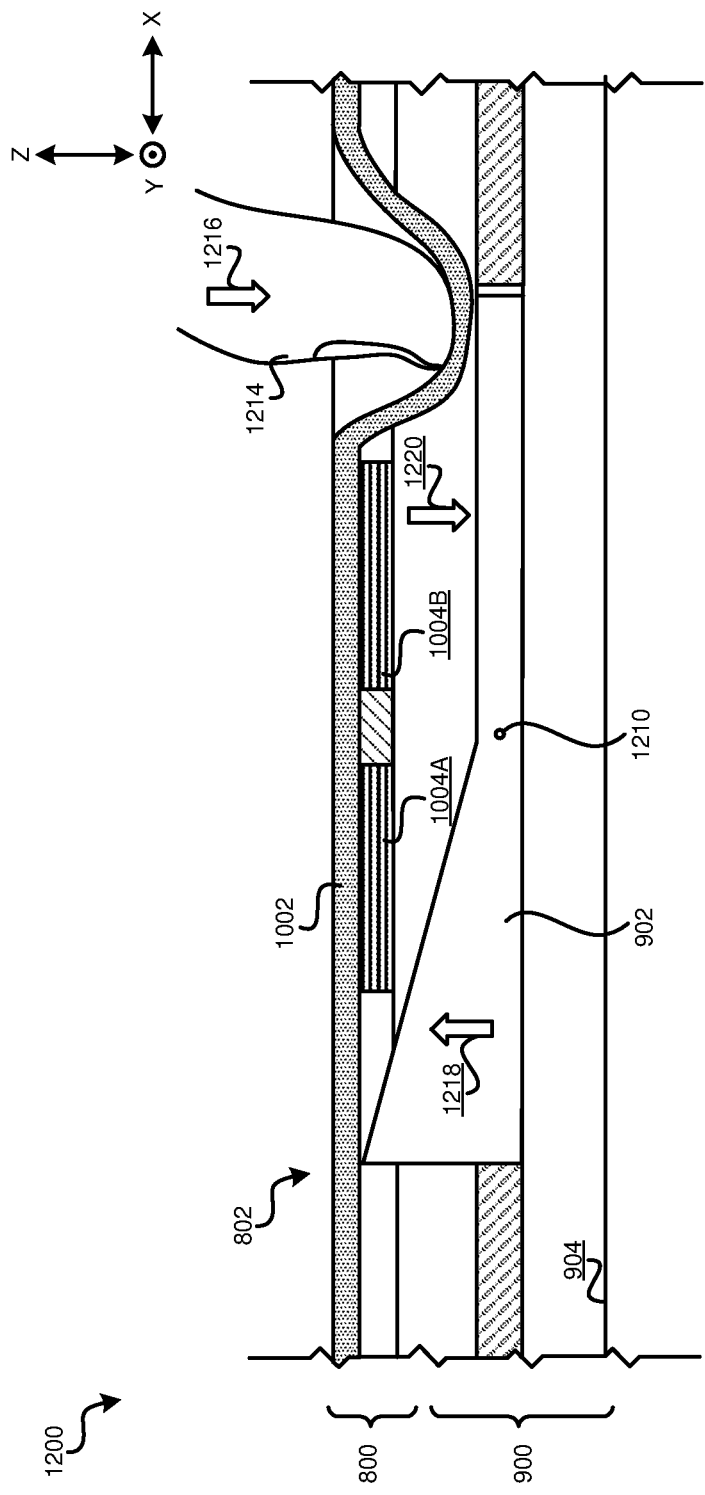
FIG. 12A depicts a partial cross-sectional view taken across section line XII-XII showing an exemplary manual operation of a legacy control device retrofitted with an automation panel in accordance with an illustrative embodiment.
Figure 12B:
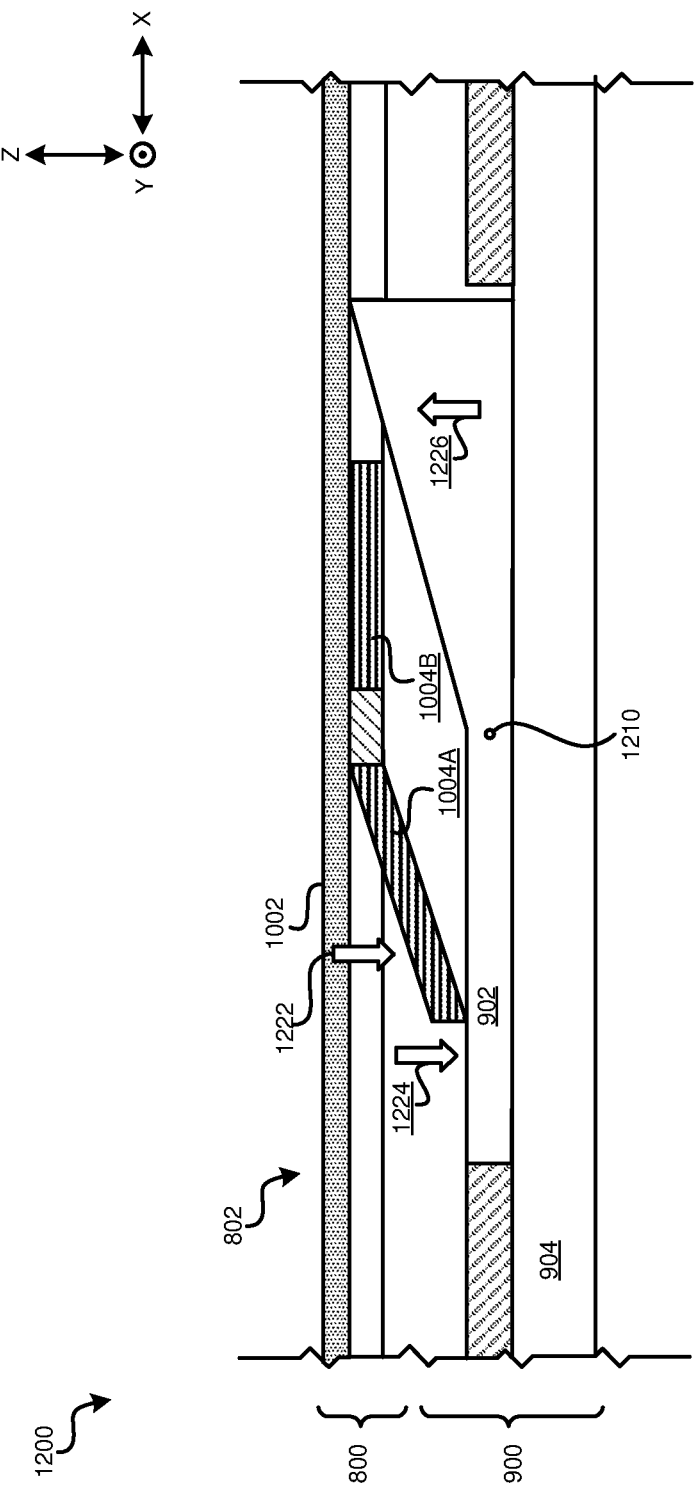
FIG. 12B depicts a partial cross-sectional view taken across section line XII-XII showing an exemplary and automatic operation of a legacy control device retrofitted with an automation panel in accordance with an illustrative embodiment.

With reference to FIGS. 12A and 12B, these figures depict a partial cross-sectional view 1200 taken across section line XII-XII showing exemplary manual and automatic operations, respectively, of a legacy control device 900 retrofitted with an automation panel 800. It will be appreciated that the view 1200 includes shapes and dimensions that may appear exaggerated for the sake of clarity. Also, it will be appreciated that the view 1200 omits certain details of the automation panel 800 and the legacy control device 900 for the sake of simplicity. For example, in some embodiments, the automation panel 800 may include one or more of the components shown in the automation panel 532 of FIG. 5 (e.g., network interface 538, temperature sensor 540, IR controller 542, IR emitter 544 and power supply 546), a processor, a memory, an input/output interface for controlling outputs from the automation panel 800 and for controlling inputs received at the automation panel 800, and/or a signal bus or other conduits that electrically connect various of the components of the automation panel 800.

For context, in FIG. 12A, the user's finger 1214 is shown pressing the substrate 802 in the direction indicated by arrow 1216 in order to operate the rocker switch 902, which prior to the press was in the position shown in FIG. 12B. The user's finger 1214 imparts a negative Z-direction force onto the substrate 802, causing the substrate 802 to deflect in the negative Z-direction against a portion of the rocker switch 902. The deflection of the substrate 802 against the rocker switch 902 causes the rocker switch 902 to pivot about a pivot point 1210 as the pressed portion of the rocker switch 902 moves in the direction indicated by arrow 1220 and the unpressed portion of the rocker switch 902 to move in the opposite direction indicated by arrow 1218. It will be appreciated that the user's finger 1214 can operate the rocker switch 902 back to the original position by similarly pressing on the substrate 802 against the other portion of the rocker switch 902.

As discussed in connection with FIG. 6, in some embodiments, during a training stage the touch sensor layer 1002 provides data indicating that a touch has occurred and the location of the touch. The location of the touch can be correlated with one side or the other of the rocker switch 902, which indicates whether the user is turning the device controlled by the rocker switch 902 ON or OFF. This ON/OFF data is collected and correlated with context data to generate training data for training an ML model to predict when the rocker switch 902 should be turned ON or OFF. After the training stage, the data from the touch sensor layer 1002 may still be used as state data to track the state of the rocker switch (ON or OFF), since a user may manually operate the switch even while it is being controlled by an automation system.

In FIG. 12B, the actuator 1004A is shown pressing a portion of the rocker switch 902 order to operate the rocker switch 902, which prior to the press was in the position shown in FIG. 12B. The deflection of the actuator 1004A in the direction indicated by arrow 1222 imparts a negative Z-direction force onto the pressed portion of the rocker switch 902, causing the rocker switch 902 to pivot about the pivot point 1210 as the pressed portion of the rocker switch 902 moves in the direction indicated by arrow 1224 and the unpressed portion of the rocker switch 902 moves in the opposite direction indicated by arrow 1226. It will be appreciated that the other actuator 1004B can operate the rocker switch 902 back to the original position by similarly pressing on the other portion of the rocker switch 902.

Figure 13:
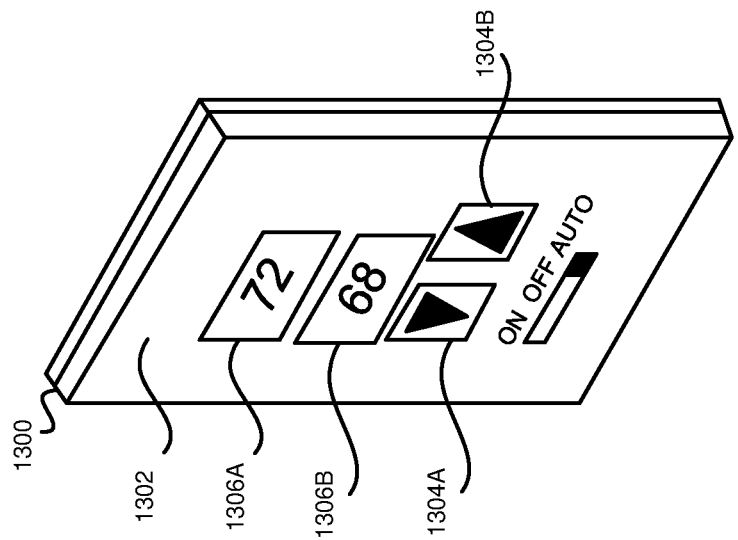
FIG. 13 depicts a perspective view of an alternative example of an automation panel in accordance with an illustrative embodiment.

With reference to FIG. 13, this figure depicts a perspective view of an alternative example of an automation panel 1300 in accordance with an illustrative embodiment. In a particular embodiment, the automation panel 1300 is an example of the automation panel 532 of FIG. 5, the automation panel 604 of FIG. 6, the automation panel 704 of FIG. 7, and/or the automation panel 800 of FIG. 8.

In the illustrated embodiment, the automation panel 1300 is adapted and configured to be installed in engagement with existing user controllable fixtures present in a home, office, or other environment of interest, and to interact with the existing user controllable fixtures so as to operate and/or control them, thereby in turn controlling and/or operating one or more luminaires, appliances, and/or devices that interface with other existing user controllable fixtures. In some embodiments, the user controllable fixtures may include any of the many components and/or fixtures commonly found in a home, office, or other environment, such as, for example, light switches, light dimmers, rheostats, electrical receptacles, motor controls, thermostats, heating, cooling, and/or ventilation controls, intrusion, fire and/or other alarm controls, irrigation and/or sprinkler controls, drape, window, and/or shutter controls, door and window locks, and appliance controls.

In the illustrated embodiment, the automation panel 1300 includes a multi-layered substrate 1302. In some embodiments, the substrate 1302 may be a flat, deformable substrate. In alternative embodiments, the substrate 1302 may be formed to conform to a certain shape for a particular implementation. For example, in the illustrated embodiment, the substrate 1302 may be shaped to conform to the outer shape of an HVAC control device having push-button style switches aligned with regions 1304A and 1304B of the substrate 1302. Also, the substrate 1302 defines windows 1306A and 1306B that allow a user to see temperature settings displayed on the legacy HVAC control device. In some embodiments, the substrate 1302 includes a touch sensor, such as a digitizer or other known touch-sensing technology.

In some embodiments, the substrate 1302 includes a touch sensor, such as the touch sensor layer 1202 of FIG. 12. In some embodiments, the touch sensor is a digitizer. In some such embodiments, the substrate 1302 comprises arrays of electrodes, such as the first and second arrays of electrodes 806A and 806B shown in FIG. 8. As discussed in connection with FIG. 8, the touch sensor of the substrate 1302 is used to measure the capacitance from each row of electrodes to each column of the electrodes in order to measure the position of an input medium such as a finger or stylus.

With reference to FIG. 14, this figure depicts an exploded view of the automation panel 1300 retrofitted to a legacy control device 1400 in accordance with an illustrative embodiment. In the illustrated embodiment, the legacy control device 1400 is an HVAC control device having a pair of push-button style switches 1404A and 1404B and a pair of temperature-setting displays 1402A and 1402B. It will be appreciated that the disclosed concepts are equally applicable to other types or styles of legacy control devices.

In the illustrated embodiment, the legacy control device 1400 includes a wall plate 1408 (also known as a cover plate or receptacle plate) such as the type that is typically installed over a legacy wall switch. The term receptacle box refers to any electrical junction box used for electrical wiring connections, including but not limited to electrical switches, electrical power outlets, electrical lights, electrical ceiling fans, telephone jacks, speaker wire outlets, antenna wire outlets, and cable-TV or data outlets. The term wall refers to walls, floors, and ceilings.

The wall plate 1408 traditionally serves both an aesthetic function and a safety function. The wall plate 1408 serves an aesthetic function by covering portions of an outlet box in which the wall switch is typically installed. The wall plate 1408 serves a safety function by blocking access to exposed wires, terminals, and other exposed elements that may be carrying an electrical current.

Removing the wall plate 1408 and the legacy control device 1400 to replace it with a smart home device circumvents the measure of safety that the wall plate 1408 otherwise provides. The disclosed automation panel 1300 overcomes this problem by providing a way to add smart-home functionality to the legacy control device 1400 without the need to remove the wall plate 1408 or other elements of the legacy control device 1400. Instead, the automation panel 1300 can be installed by attaching it to the exposed outer-facing side of the legacy control device 1400. In the illustrated embodiment, adhesive or double-sided tape 1406 is used to attach the automation panel 1300 to the legacy control device 1400, however, other attachment techniques may be used.

With reference to FIG. 15, this figure depicts a flowchart of an example process 1500 for a retrofitting an automation panel onto a legacy control device in accordance with an illustrative embodiment. In a particular embodiment, the automation panel is an automation panel 532 of FIG. 5 and the smart home controller 500 performs the processor-based portions of the process 1500.

In an embodiment, at block 1502, an automation panel is attached to an existing legacy control device. In some embodiments, the automation panel includes a multi-layered substrate, comprising a first layer that senses manual actuation of a control element of the control device and a second layer that automatically actuates the control element in response to a specified control signal. Next, at block 1504, the process periodically collects state data and context data for a predetermined period of time. In some embodiments, the state data is indicative of an actuation state of the control element, and the context data is indicative of conditions at a time that the state data is collected. In some embodiments, the context data comprises sensor data indicative of an environmental property affected by a state of a system that is altered by actuation of the control element. Next, at block 1506, the process generates a training dataset comprising state data and context data collected during the predetermined period of time. Next, at block 1508, the process trains a machine-learning classification model using the training dataset to output a predicted actuation state of the control element based on inputted context data. next, at block 1510, the process deploys the thus trained machine-learning classification model to process current context data. next, at block 1512, the trained machine-learning classification model processes current context data using the deployed trained machine-learning classification model. next, at block 1514, the process determines if a mismatch has been detected. if not, the process returns to block 1512. If a mismatch is detected, the process continues to block 1516. Next, at block 1516, the process transmits, automatically responsive to the mismatch, the specified control signal to the automation panel thereby causing the automation panel to actuate the control element, then returns to block 1512.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:

retrofitting an existing control device with a multi-layered automation panel, wherein the automation panel comprises a first layer that senses manual actuation of a control element of the control device and a second layer that automatically actuates the control element in response to a specified control signal;

collecting, by a processor, periodically for a predetermined period of time, state data indicative of an actuation state of the control element, and context data of conditions at a time that the state data is collected, the context data comprising sensor data indicative of an environmental property affected by a state of a system that is altered by actuation of the control element;

generating, by the processor, a training dataset comprising state data and context data collected during the predetermined period of time;

training, by the processor, a machine-learning classification model using the training dataset to output a predicted actuation state of the control element based on inputted context data;

deploying, by the processor, the thus trained machine-learning classification model to process current context data;

detecting, by the processor, a mismatch between the predicted actuation state output from the trained machine-learning classification model and an actual actuation state of the control element; and transmitting, by the processor, automatically responsive to the mismatch, the specified control signal to the automation panel thereby causing the automation panel to actuate the control element.

2. The method of claim 1, wherein the machine-learning classification model outputs, as the predicted actuation state, an indication of one of two possible actuation states of the control element comprising an on-position state and an off-position state.

3. The method of claim 2, wherein the existing control device is a luminaire control device, the actuating of the control element changes an amount of light emitted by the luminaire, and the environmental property comprises an ambient light level.

4. The method of claim 1, wherein the machine-learning classification model outputs, as the predicted actuation state, an indication of one of a plurality of possible actuation states of the control element.

5. The method of claim 4, wherein the plurality of possible actuation states comprises an unchanged state in which the control element remains unactuated and a multi-press state involving actuating the control element a prescribed number of times.

6. The method of claim 5, wherein the existing control device is an HVAC control device, the actuating of the control element changes an HVAC temperature setting, and the environmental property comprises an ambient air temperature.

7. The method of claim 1, wherein the collecting of the state data comprises sensing the manual actuation of the control element using a touch panel of the first layer of the automation panel.

8. The method of claim 1, further comprises actuating the control element using a piezoelectric device of the second layer of the automation panel.

9. The method of claim 1, wherein the control element remains manually actuatable by a user after the retrofitting.

10. An automation system comprising:
a multi-layered automation panel configured to be retrofitted onto an existing control device, wherein the automation panel comprises a first layer that senses manual actuation of a control element of the control device and a second layer that automatically actuates the control element in response to a specified control signal; and
a controller comprising one or more computer readable storage media, and program instructions collectively stored on the one or more computer readable storage media, the program instructions executable by one or more processors to cause the one or more processors to perform operations comprising:
collecting, periodically for a predetermined period of time, state data indicative of an actuation state of the control element, and context data of conditions at a time that the state data is collected, the context data comprising sensor data indicative of an environmental property affected by a state of a system that is altered by actuation of the control element;
generating a training dataset comprising state data and context data collected during the predetermined period of time;
training a machine-learning classification model using the training dataset to output a predicted actuation state of the control element based on inputted context data;
deploying the thus trained machine-learning classification model to process current context data;
detecting a mismatch between the predicted actuation state output from the trained machine-learning classification model and an actual actuation state of the control element; and
transmitting, automatically responsive to the mismatch, the specified control signal to the automation panel thereby causing the automation panel to actuate the control element.

11. The automation system of claim 10, wherein the machine-learning classification model outputs, as the predicted actuation state, an indication of one of two possible actuation states of the control element comprising an on-position state and an off-position state.

12. The automation system of claim 11, wherein the existing control device is a luminaire control device, the actuating of the control element changes an amount of light emitted by the luminaire, and the environmental property comprises an ambient light level.

13. The automation system of claim 10, wherein the machine-learning classification model outputs, as the predicted actuation state, an indication of one of a plurality of possible actuation states of the control element.

14. The automation system of claim 13, wherein the plurality of possible actuation states comprises an unchanged state in which the control element remains unactuated and a multi-press state involving actuating the control element a prescribed number of times.

15. The automation system of claim 14, wherein the existing control device is an HVAC control device, the actuating of the control element changes an HVAC temperature setting, and the environmental property comprises an ambient air temperature.

16. The automation system of claim 10, wherein the collecting of the state data comprises sensing the manual actuation of the control element using a touch panel of the first layer of the automation panel.

17. The automation system of claim 10, wherein the operations further comprise actuating the control element using a piezoelectric device of the second layer of the automation panel.

18. The automation system of claim 10, wherein the control element remains manually actuatable by a user after the retrofitting.

19. A computer program product, the computer program product comprising one or more computer readable storage media, and program instructions collectively stored on the one or more computer readable storage media, the program instructions executable by one or more processors to cause the one or more processors to perform operations comprising:
detecting registration of a multi-layered automation panel on a network, the multi-layered automation panel being retrofitted to an existing control device, wherein the automation panel comprises a first layer that senses manual actuation of a control element of the control device, and a second layer that automatically actuates the control element in response to a specified control signal;
collecting, by a processor, periodically for a predetermined period of time, state data indicative of an actuation state of the control element, and context data of conditions at a time that the state data is collected, the context data comprising sensor data indicative of an environmental property affected by a state of a system that is altered by actuation of the control element;

generating, by the processor, a training dataset comprising state data and context data collected during the predetermined period of time;

training, by the processor, a machine-learning classification model using the training dataset to output a predicted actuation state of the control element based on inputted context data;

deploying, by the processor, the thus trained machine-learning classification model to process current context data;

detecting, by the processor, a mismatch between the predicted actuation state output from the trained machine-learning classification model and an actual actuation state of the control element; and transmitting, by the processor, automatically responsive to the mismatch, the specified control signal to the automation panel thereby causing the automation panel to actuate the control element.

20. The computer program product of claim 19, wherein the machine-learning classification model outputs, as the predicted actuation state, an indication of one of at least two possible actuation states of the control element.

* * * * *